(12) United States Patent
Kannan et al.

(10) Patent No.: US 9,331,341 B2
(45) Date of Patent: May 3, 2016

(54) DURABLE PLATINUM/MULTI-WALLED CARBON NANOTUBE CATALYSTS

(75) Inventors: Arunachala Kannan, Mesa, AZ (US); Jiefeng Lin, Rochester, NY (US)

(73) Assignee: Arizona Board of Regents, acting for and on behalf of Arizona State University, Scottsdale, AZ (US)

( * ) Notice: Subject to any disclaimer, the term of this patent is extended or adjusted under 35 U.S.C. 154(b) by 788 days.

(21) Appl. No.: 13/635,073

(22) PCT Filed: Mar. 17, 2011

(86) PCT No.: PCT/US2011/028784
§ 371 (c)(1),
(2), (4) Date: Sep. 14, 2012

(87) PCT Pub. No.: WO2011/116169
PCT Pub. Date: Sep. 22, 2011

(65) Prior Publication Data
US 2013/0005567 A1    Jan. 3, 2013

Related U.S. Application Data

(60) Provisional application No. 61/314,855, filed on Mar. 17, 2010.

(51) Int. Cl.
| | |
|---|---|
| H01M 4/92 | (2006.01) |
| B82Y 30/00 | (2011.01) |
| B82Y 40/00 | (2011.01) |
| H01M 8/10 | (2016.01) |

(52) U.S. Cl.
CPC ................ *H01M 4/92* (2013.01); *B82Y 30/00* (2013.01); *B82Y 40/00* (2013.01); *H01M 4/926* (2013.01); *H01M 2008/1095* (2013.01); *Y02E 60/50* (2013.01)

(58) Field of Classification Search
CPC ...... B01J 21/185; B01J 23/42; B01J 35/0033; B01J 37/0018; B01J 37/08; B01J 37/16; C01B 31/022; H01M 4/9058; H01M 4/9083; H01M 4/926; H01M 4/96
USPC ........... 502/185; 429/400, 524; 977/745, 748, 977/752, 948
See application file for complete search history.

(56) References Cited

U.S. PATENT DOCUMENTS

| | | |
|---|---|---|
| 2002/0098135 A1* | 7/2002 | Smalley et al. ............... 422/198 |
| 2004/0180787 A1 | 9/2004 | Rolison |
| 2007/0184332 A1 | 8/2007 | Park |
| 2008/0200329 A1 | 8/2008 | Mitani |

(Continued)

FOREIGN PATENT DOCUMENTS

| | | | |
|---|---|---|---|
| JP | 2008-183508 | 8/2008 | |
| WO | 2008/048192 | * 4/2008 | .............. C01B 31/08 |

(Continued)

OTHER PUBLICATIONS

U.S. Appl. No. 61/314,855, filed Mar. 17, 2010, Jiefeng Lin.

(Continued)

*Primary Examiner* — Patricia L Hailey
(74) *Attorney, Agent, or Firm* — Ballard Spahr LLP

(57) ABSTRACT

Platinum nanocatalysts on multi-walled carbon nanotubes (MWCNTs) functionalized with citric acid (CA) are disclosed, along with methods for the synthesis thereof.

19 Claims, 23 Drawing Sheets

(56) References Cited

U.S. PATENT DOCUMENTS

| 2010/0173376 A1* | 7/2010 | Ostojic et al. ................ 435/176 |
| 2010/0177462 A1* | 7/2010 | Adzic et al. .................. 361/502 |
| 2011/0053050 A1* | 3/2011 | Lim et al. ..................... 429/524 |

FOREIGN PATENT DOCUMENTS

| WO | WO 2008/048192 | 4/2008 |
| WO | WO 2011/116169 | 9/2011 |

OTHER PUBLICATIONS

Brust M, et al., "Synthesis of thiol-derivatised gold nanoparticles in a two-phase liquid-liquid system," J. Chem. Soc., Chem. Commun., (1994).

Kiely CJ, et al., "Spontaneous ordering of bimodal ensembles of nanoscopic gold clusters," Letter to nature, 396: 444-446 (1998).

Lin JF, et al., "Development of durable platinum nanocatalyst on carbon nanotubes for proton exchange membrane fuel cells," Fuel Cell Research lab, Engineering Technology Department, Arizona State Univeristy, Mesa, AZ 85212, USA, Apr. 2010.

Lin JF, et al., "Synthesis and characterization of carbon nanotubes supported platinum nanocatalyst for proton exchange membrane fuel cells," Journal of Power Sources, 195:466-470, Jan. 2010.

Saunders AE, et al., "Growth kinetics and metastability of monodisperse tetraoctylammonium bromide capped gold nanocrystals," J. Phys. Chem. B, 108: 193-1999 (2004).

International Preliminary Report on Patentability issued by the International Bureau on Sep. 18, 2012 for PCT/US2011/028784 filed on Mar. 17, 2011 and published as WO 2011/116169 on Sep. 22, 2011 (Applicant—Arizona Board of Regents Acting for and on behalf of Arizona State University // Inventors—Lin, et al.) (6 pages).

International Search Report mailed by the International Bureau on Nov. 29, 2011 for PCT/US2011/028784 filed on Mar. 17, 2011 and published as WO 2011/116169 on Sep. 22, 2011 (Applicant—Arizona Board of Regents Acting for and on behalf of Arizona State University // Inventors—Lin, et al.) (3 pages).

Written Opinion mailed by the International Bureau on Nov. 29, 2011 for PCT/US2011/028784 filed on Mar. 17, 2011 and published as WO 2011/116169 on Sep. 22, 2011 (Applicant—Arizona Board of Regents Acting for and on behalf of Arizona State University // Inventors—Lin, et al.) (5 pages).

* cited by examiner

DURABLE PLATINUM/MULTI-WALLED CARBON NANOTUBE CATALYSTS

CROSS-REFERENCE TO RELATED APPLICATIONS

The present application is a National Phase Application of International Application No. PCT/US2011/028784, filed on Mar. 17, 2011, which claims priority to U.S. Provisional Patent Application Ser. No. 61/314,855, filed on Mar. 17, 2010, both of which applications are incorporated herein fully by this reference.

BACKGROUND

1. Technical Field

The present disclosure relates to catalysts suitable for use in fuel cells, and specifically to platinum (Pt) multi-walled carbon nanotube (MWCNT) catalysts.

2. Technical Background

A fuel cell (FC) is a device that converts energy of a chemical reaction into electrical energy (electrochemical device) without combustion. A fuel cell generally comprises an anode, cathode, electrolyte, backing layers, and flow fields/current collectors. There are generally five types of fuel cells, as defined by their electrolytes:

| Type | Electrolyte | Temperature | Comments |
| --- | --- | --- | --- |
| Phosphoric acid (PAFC) | Liquid phosphoric acid | 175-200° C. | Stationary power, commercially available |
| Molten carbonate (MCFC) | Liquid solution of lithium, sodium and/or potassium carbonates | 600-1200° C. | Molten carbonate salts, high efficiency |
| Solid oxide (SOFC) | Solid zirconium oxide/ytrria | 600-1800° C. | Ceramic, high power, industrial applications |
| Alkaline (AFC) | Aqueous electrolyte solution | 90-100° C. | Potassium hydroxide electrolyte, NASA, very expensive |
| Proton exchange membrane (PEM) | Solid organic polymer | 60-100° C. | Ionomer membrane, high power density, can vary output quickly, portable/auto applications |
| Direct Memanol (DMFC) | Solid organic polymer | 60-100° C. | PEM that uses methanol for fuel |

The current disclosure is directed to catalyst material that are suitable for use with proton exchange membrane (a.k.a. polymer electrolyte membrane) (PEM) fuel cells (a.k.a. solid polymer electrolyte (SPE) fuel cell, polymer electrolyte fuel cell, and solid polymer membrane (SPM) fuel cell).

Among the various types of fuel cells, proton exchange membrane fuel cells (PEMFC) have unique characteristics, such as relatively low operating temperatures, high power densities and efficiencies, as well as the ability to respond quickly to changing power demands. A polymer electrolyte membrane fuel cell (PEMFC) comprises a proton conductive polymer membrane electrolyte sandwiched between electrocatalytic layers.

In a PEM fuel cell, the oxidation and reduction reactions occurring are:

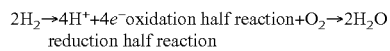

$2H_2 \rightarrow 4H^+ + 4e^-$ oxidation half reaction + $O_2 \rightarrow 2H_2O$ reduction half reaction This electrochemical process is a non-combustion process which does not generate airborne pollutants. Therefore, fuel cells are a clean, low emission, highly efficient source of energy. Fuel cells can have 2-3 times greater efficiency than internal combustion engines and can use abundant and/or renewable fuels. Fuel cells produce electricity, water, and heat using fuel and oxygen. When hydrogen is used as the fuel, the only emission from a PEM fuel cell is water.

Since the voltage of a typical fuel cell is small, a number of individual cells are usually stacked in series. In addition, the two half-reactions normally occur slowly at the low operating temperatures of the fuel cell, thus catalysts are used on one or both the anode and cathode to increase the rates of each half reaction. Kinetic performance of PEM fuel cells is limited primarily by the slow rate of the $O_2$ reduction half reaction (cathode reaction) which is more than 100 times slower than the $H_2$ oxidation half reaction (anode reaction). The $O_2$ reduction half reaction is limited, in part, by mass transfer issues.

As fuel, such as hydrogen, flows into a fuel cell on the anode side, a catalyst facilitates the separation of the hydrogen gas fuel into electrons and protons (hydrogen ions). The hydrogen ions pass through the membrane and, again with the help of the catalyst, combine with an oxidant, such as oxygen, and electrons on the cathode side, producing water. The electrons, which cannot pass through the membrane, flow from the anode to the cathode through an external circuit containing a motor or other electrical load, which consumes the power generated by the cell.

A catalyst is used to induce the desired electrochemical reactions at the electrodes. The catalyst is often incorporated at the electrode/electrolyte interface by coating a slurry of the electrocatalyst particles to the electrolyte surface. When hydrogen or methanol fuel feed through the anode catalyst/electrolyte interface, electrochemical reaction occurs, generating protons and electrons. The electrically conductive anode is connected to an external circuit to carry electrons. The polymer electrolyte is typically a proton conductor, and protons generated at the anode catalyst migrate through the electrolyte to the cathode. At the cathode catalyst interface, the protons can combine with electrons and oxygen to generate water.

The catalyst is typically a particulate metal, such as platinum, and is dispersed on a high surface area electronically conductive support, such as, for example, carbon black. Platinum (Pt) has been the most effective noble metal catalyst to date because it is able to generate sufficiently high rates of $O_2$ reduction at the relatively low operating temperatures of PEM fuel cells. Proton conductive materials, such as Nafion®, are often added to facilitate transfer of the protons from the catalyst to the membrane interface.

Nanosized catalyst particles have unique characteristics such as the high specific surface area and superior catalytic activity, thus exhibit higher performance even at lower catalyst loading. Effective utilization of catalyst is typically feasible only through a homogeneous distribution of the catalyst on a high surface area support material.

For wide-scale commercialization, the PEMFCs need to overcome several challenges including cost and durability. Platinum is the most effective electrocatalyst for the PEMFCs because it is sufficiently reactive in bonding hydrogen and oxygen intermediates facilitating the electrode processes to form the final product, but the high cost of Pt limits catalyst loadings per unit area (or unit power output). The durability of PEMFC systems is typically controlled by the stability of membrane electrode assembly (MEA). For the PEMFCs to be commercially viable, fuel cells should meet the US Department of Energy's (DOE) targeted lifespan of 50,000 and 5,500 hours for the stationary and automotive applications, respectively.

One of the strategies to lower the Pt catalyst requirement is to improve the electrochemically active surface area (ECSA) by synthesizing nano-size particles with homogenous distribution on the surface of the catalyst support materials. There are several different procedures described in the literature to synthesize the Pt nanoparticles, such as the polyol process, electrodeposition, sonochemical processes, gas reduction, and a solution reduction method; however, when the size of Pt catalyst particles is <3 nm, the observed degradation of the resulting MEA incorporating the catalyst is dramatically increased. All these methods have been successful in yielding Pt nanoparticles, but the methods have produced wide particle size ranges due to agglomeration or inefficient control of nuclei growth.

The performance and durability of Pt catalysts for use in a fuel cell can be evaluated by accelerated methods, such as cyclic voltammetry (CV). For example, Pt nanoparticles can partially dissolve in an electrode during use, due to acidic conditions. Over time, this dissolution results in the loss of the precious metal catalyst. The dissolution of Pt in an MEA can be evaluated by cycling the potential applied to the MEA between 0.1 and 1.2 V to measure the loss of Pt electrocatalyst. When the upper voltage limit is increased from 1 to 1.2 V, the amount of dissolution observed is significantly increased.

MWCNTs and their composites have gained wide-scale interest as catalyst support materials due to their unique properties such as high chemical and oxidative stability, extraordinary mechanical strength, good electronic conductivity, high surface area and relatively simple manufacturing process. In contrast to traditional carbon black supports, the highly inert surfaces of MWCNTs necessitate surface modification to enhance the attachment of Pt nanoparticles.

Thus, a need exists for durable, fuel cell catalysts that can provide improved fuel cell performance and reduced cost over conventional catalyst technologies. These needs and other needs are satisfied by the compositions and methods of the present invention.

SUMMARY

In accordance with the purpose(s) of the invention, as embodied and broadly described herein, this disclosure, in one aspect, relates to catalysts suitable for use in fuel cells, and specifically to platinum multi-walled carbon nanotube catalysts.

In one aspect, the present disclosure provides a multi-walled carbon nanotube supported platinum catalyst having improved durability over conventional catalyst materials.

In another aspect, the present disclosure provides a method for modifying the surface of a multi-walled carbon nanotube, the method comprising: contacting the multi-walled carbon nanotubes with a citric acid solution.

In yet another aspect, the present disclosure provides a method for preparing a multi-walled carbon nanotube supported platinum catalyst, the method comprising: providing an organic solution comprising platinum ions; contacting the organic solution with a surface modified multi-walled carbon nanotube; and heat treating the multi-walled carbon nanotube after contacting.

BRIEF DESCRIPTION OF THE FIGURES

The accompanying figures, which are incorporated in and constitute a part of this specification, illustrate several aspects and together with the description serve to explain the principles of the invention.

Figure 1:
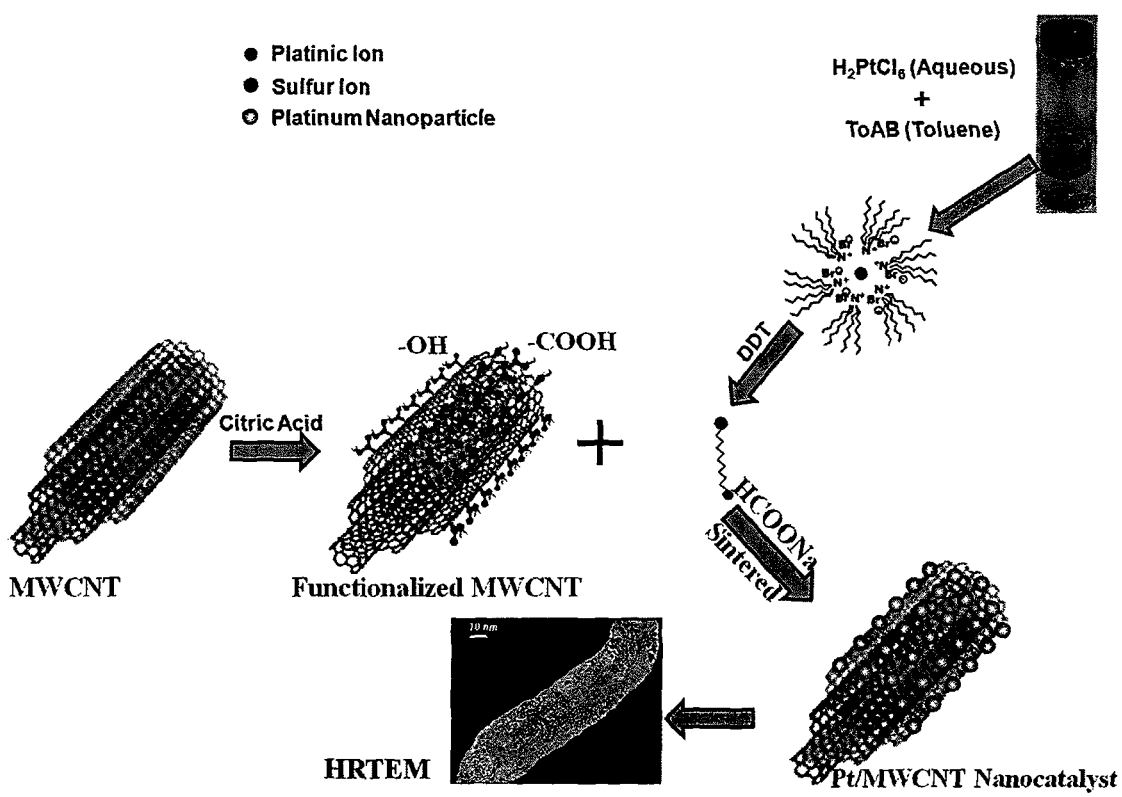
FIG. 1 illustrates a schematic representation of surface modification of MWCNT's and Pt nanoparticle deposition, in accordance with various aspects of the present disclosure.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

DEFINITIONS

As used in the specification and the appended claims, the singular forms "a," "an" and "the" include plural referents unless the context clearly dictates otherwise. Thus, for example, reference to "a metal" includes mixtures of two or more metals.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

An "optionally substituted" compound refers to a compound that can be, but does not have to be, substituted with a substituent, such as those described below or other substituents that are not specifically disclosed but would not interfere with the desired function of the compound.

"Fuel cell" (FC) as used herein is an electrochemical device that converts chemical energy into electrical energy without combustion. Various types of fuel cells include solid oxide (SOFC), molten carbonate (MCFC), alkaline (AFC), phosphoric acid (PAFC), PEM, and direct methanol (DMFC) fuel cells.

A "proton exchange membrane" (PEM), is also known or referred to as polymer electrolyte membrane, solid polymer membrane (SPM), or solid polymer electrolyte (SPE) in the fuel cell art. A PEMFC is a type of fuel cell that utilizes a polymer electrolyte membrane to carry protons between two catalytic electrode layers, thus generating electrical current. A PEM typically operates at temperatures up to about 100° C.

"Membrane electrode assembly" (MEA) is a term used for an assembly which normally comprises a polymer membrane with affixed/adjacent electrode layers. In some cases the MEA may also include gas diffusion layer/materials.

"Metal" as used herein can be, e.g., a precious metal, noble metal, platinum group metals, platinum, alloys and oxides of same, and compositions that include transition metals and oxides of same. As used herein, it is a "metal" that acts as a catalyst for the reactions occurring in the fuel cell. The metal may be tolerant of CO contaminants and may also be used in direct methanol fuel cells.

"Ionomer," is an ionically conductive polymer (e.g., Nafion®). An ionomer is also frequently used in the electrode layer to improve ionic conductivity.

"Membrane," can be known as polymer electrolyte membrane, solid polymer electrolyte, proton exchange membrane, separator, or polymer membrane. The "membrane" is an ionically conductive, dielectric material against which catalytic electrodes are placed or affixed. Typically currently in the art, the membrane most frequently used is a perfluorosulfonated polymer (e.g., Nafion®), which can be obtained in varying thicknesses, equivalent weights, etc.

"Electrolyte" as used herein is a nonmetallic electric conductor in which current is carried by the movement of ions or a substance that when dissolved in a suitable solvent becomes an ionic conductor. The polymer membrane of a fuel cell is the electrolyte.

"Electrocatalyst," also referred to as a "catalyst," is a metal (as defined above) which is catalytic for fuel cell reactions, typically supported on a catalyst support (defined below).

"Supported catalyst" is a metal (as defined above) dispersed on a support.

"Catalyst support" is a material upon which metal (as defined above) is dispersed, typically conductive (e.g., carbon black, carbon nanotube).

"Electrode," as used herein, is the layer of supported electrocatalyst in contact with and/or affixed to a membrane. The electrode may include ionomer and other materials in addition to the electrocatalyst.

"Oxygen reduction reaction," also known as ORR, cathode reaction, or cathodic process, is a reaction in which oxygen gas is reduced in the presence of protons, producing water.

"Hydrogen oxidation reaction" is also known as HOR, anode reaction, or anodic process. This is a reaction in which hydrogen gas is converted into protons and electrons.

"Protons," sometimes referred to in a the fuel cell context as $H^+$, hydrogen ions, or positive ions, are a positively charged portion of hydrogen atom which results from reaction over catalyst material.

"Anode" is the electrode where fuel oxidation reaction occurs.

"Cathode" is the electrode where oxidant reduction reaction occurs.

"Gas diffusion layer," or GDL or porous backing layer, is a layer adjacent to the electrodes which aides in diffusion of gaseous reactants across the electrode surface; it is typically a carbon cloth or carbon-based/carbon-containing paper (e.g., one manufactured by Toray). The GDL should be electrically conductive to carry electrons through an external circuit.

"Current collector" is the portion of a fuel cell adjacent to the GDL through which electrons pass to an external circuit; it may also contain channels or paths (flow field) to assist in gas distribution and is typically made of graphite or conductive composites.

"Flow field" is the scheme for distributing gaseous reactants across the electrode. A flow field may be part of a current collector and/or a GDL.

"Insulator," or dielectric, is a material which is not electrically conductive.

"Electrical conductivity," or electronic conductivity, is the ability of a material to conduct electrons.

"Protonic conductivity" or ionic conductivity (IC), is the ability of a material to conduct ions or protons.

"Platinization," or more generically, "metallization," is a process of depositing or precipitating metal (as defined above) onto the surface of a catalyst support. Specifically, platinization is a process of depositing or precipitating platinum (Pt) onto the surface of a catalyst support.

"Polarization curve," IV curve, or current-voltage curve, is the data/results from electrochemical analysis of MEAs or catalyst materials.

"Cyclic Voltammetry" (CV) is an analysis method for determining Electrochemically Active Surface Area (ECSA) and accelerated durability of MEAs or catalyst materials.

"Transmission Electron Microscopy" (TEM), is an analysis method for obtaining nanocatalyst particle distribution and size of dispersed metal nanoparticles.

"Electrochemical Impedance Spectroscopy" (EIS), is an analysis method for determining the impedance of MEAs or catalyst materials.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

As briefly described above, the present invention is directed to catalysts for fuel cells, and specifically to MWCNT supported Pt catalysts that can be used in PEM fuel cells. Described herein are catalyst compositions and methods for the synthesis, for example, by wet chemical methods, and use thereof. In one aspect, the surface of at least a portion of a MWCNT can be modified by, for example, citric acid, to introduce functional groups which can act as anchors for a metal. In another aspect, a two-phase, for example, water-toluene, method can be used to transfer $PtCl_6^{2-}$ from an aqueous phase to an organic phase. In such an aspect, a subsequent sodium formate solution reduction step can yield a plurality of Pt nanoparticles on the MWCNTs. In another aspect, high resolution TEM images illustrate that deposited platinum particles can be in the size range of 1-3 nm, and can be homogeneously distributed on the surface of MWCNTs. In one aspect, the resulting Pt/MWCNTs nanocatalysts can be evaluated in an operating proton exchange membrane single cell fuel cell. In another aspect, such a fuel cell can exhibit a peak power density of at least about 1,100 $mW \cdot cm^{-2}$ with a total catalyst loading of 0.6 mg $Pt \cdot cm^{-2}$ (anode: 0.2 mg $Pt \cdot cm^{-2}$ and cathode: 0.4 mg $Pt \cdot cm^{-2}$). In such an aspect, the performance of the Pt/MWCNTs nanocatalyst can remain stable for a period of at least about 100 h at 80° C. at ambient pressure and the performance (current density at 0.4 V). In yet another aspect, the electrochemically active surface area (ECSA) of 64 $m^2 \cdot g^{-1}$ as determined by cyclic voltammetry (CV) does not show any or any appreciable decrease after such a 100 h evaluation.

Preparation of Pt/MWCNT Catalysts

In one aspect, and with reference to the figures, FIG. 1 illustrates a schematic of an exemplary method to modify the surface of MWCNTs and then deposit platinum nanoparticles thereon.

MWCNT

In one aspect, the MWCNTs of the present invention can comprise any MWCNT material suitable for use as a catalyst in a fuel cell. In another aspect, the MWCNTs or a portion thereof can have an outer diameter of from about 10 to about 50 nm, for example, about 10, 20, 30, 40, or 50 nm. In another example, the MWCNTs or a portion thereof can have an outer diameter of from about 20 nm to about 30 nm, for example, about 20, 22, 24, 26, 28, or 30 nm. In yet other aspects, the MWCNTs or a portion thereof can have an outer diameter of less than about 10 nm or greater than about 50 nm, and the present disclosure is not intended to be limited to any particular size MWCNT.

In another aspect, the MWCNTs of the present invention are pure or substantially pure, for example, greater than about 90%, greater than about 95%, greater than about 97%, greater than about 98%, or greater than about 99%. In another aspect, the MWCNTs of the present invention have an ash content of less than about 5%, less than about 3%, less than about 2%, less than about 1.5%, less than about 1%, or less than about 0.5%.

In still other aspects, the MWCNTs of the present invention can comprise a mixture of MWCNTs having the same or varying diameters, aspect ratios, compositions, surface areas, purities, and/or ash contents. MWCNTs are commercially available (e.g., Cheaptubes Co.) and one of skill in the art could readily select an appropriate MWCNT or mixture thereof.

Modification of MWCNT Surface

In one aspect, all or a portion of the surface of the MWCNTs material can be modified so as to better anchor platinum particles deposited thereon. In another aspect, the surface chemistry of the MWCNTs is modified such that platinum ions can nucleate and form platinum nanoparticles (or clusters) at various points across the MWCNT surface.

In one aspect, the MWCNT surface is modified by contacting with an acid, such as, for example, an aqueous citric acid solution. In various aspects, the concentration of the acid solution can vary depending on the specific level of desired modification. In various aspects, the concentration of acid can range from greater than 0 to about 50 mM, for example, about 1, 2, 3, 4, 5, 6, 8, 10, 20, 30, 40, or 50 mM. In other aspects, the concentration of acid can range from about 0.5 to about 5 mM, for example, about 0.5, 1, 1.5, 2, 2.5, 3, 3.5, 4, 4.5, or 5 mM. In still other aspects, the concentration of acid can range from about 1 to about 2 mM, for example, about 1, 1.1, 1.2, 1.3, 1.4, 1.5, 1.6, 1.7, 1.8, 1.9, or 2 mM. In still other aspects, the concentration of acid can comprise other values not specifically recited here, and the present invention is not intended to be limited to any particular citric acid concentration. In an exemplary aspect, an aqueous citric acid solution is used that has a concentration of from about 0.5 mM to about 5 mM.

In one aspect, the concentration of citric acid is sufficient to modify a portion of the MWCNT surface and facilitate platinum deposition without resulting in platinum agglomeration. In a specific aspect, the citric acid concentration is about 1.6 mM.

After contacting with acid, at least a portion of the MWCNT surface can be modified. In one aspect, at least a portion of the surface comprises a plurality of carboxylic acid groups. In another aspect, a portion of the surface of a MWCNT that has been contacted with an acid comprises a higher number of carboxylic acid groups than a comparable MWCNT that has not been contacted with the same or a different acid. The carboxylic acid functional groups can, in one aspect, act as anchors for metal catalyst particles deposited thereof.

Preparation and Deposition of Catalytic Metal

In one aspect, the process to synthesize Pt/MWCNTs nanocatalysts comprises a transfer of platinum ions between the phases of a two-phase transfer, followed by a reduction, such as, for example, a sodium formate reduction. In a specific aspect, platinum ions from a platinum containing precursor, such as, for example, $PtCl_6^{2-}$, can be transferred from an aqueous phase to an organic phase, such as, for example, a toluene solution using a phase transfer catalyst, such as, for example, tetraoctylammonium bromide (ToAB), and then subsequently be reduced using, for example, aqueous sodium formate solution in presence of a capping agent, such as, for example, 1-dodecanethiol to yield platinum nanoparticles.

In another aspect, the process can be illustrated in the following two chemical reactions:

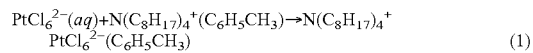

$$PtCl_6^{2-}(aq) + N(C_8H_{17})_4^+(C_6H_5CH_3) \rightarrow N(C_8H_{17})_4^+ PtCl_6^{2-}(C_6H_5CH_3) \quad (1)$$

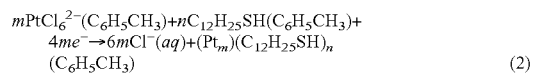

$$mPtCl_6^{2-}(C_6H_5CH_3) + nC_{12}H_{25}SH(C_6H_5CH_3) + 4me^- \rightarrow 6mCl^-(aq) + (Pt_m)(C_{12}H_{25}SH)_n(C_6H_5CH_3) \quad (2)$$

wherein the electrons in reaction (2) are provided by $HCOO^-$ from a reducing solution, and wherein the ratio n/m determines the ratio of thiol ligand to platinum.

In one aspect, and while not wishing to be bound by theory, the thiol compound, such as, for example, 1-doedecanethiol, can form a self-assembled monolayer on the growing platinum nuclei inhibiting agglomeration in the solution. In another aspect, the thiol compound can assist in the distribution of Pt nanoparticles on MWCNTs so as to achieve, for example, a homogeneous or substantially homogeneous distribution of uniform or substantially uniform platinum particles.

A metal, such as a catalytic metal, can be deposited on the surface of a modified MWCNT, subsequent to its preparation. In one aspect, the metal can be any metal capable of catalyzing one or more fuel cell reactions. In one aspect, the metal comprises platinum or an alloy thereof. In a specific aspect, the metal is platinum.

In one aspect, a catalytic metal precursor is capable of providing the catalytic metal, such as, for example, platinum, for subsequent deposition onto a modified MWCNT. In one aspect, the catalytic metal precursor comprises an aqueous solution of a catalytic metal. In various aspects, the catalytic metal precursor can comprise a platinum salt, such as, for example, chloroplatinic acid, platinum nitrate, platinum halides, platinum cyanide, platinum sulfide, organoplatinum salts, or a combination thereof. In a specific aspect, the catalytic metal precursor comprises chloroplatinic acid.

In another aspect, at least a portion of the platinum ions from the catalytic metal precursor are transferred from an aqueous phase into an organic solvent. In various aspects, the organic solvent comprises any solvent suitable for use with the methods of the present invention. In one aspect, the organic solvent comprises toluene.

In one aspect, the transfer of platinum ions from, for example, an aqueous chloroplatinic acid solution, to, for example, a toluene solution, can be performed with a phase transfer catalyst. In various aspects, the phase transfer catalyst can comprise any phase transfer catalyst suitable for the methods of the present disclosure. In one aspect, the phase transfer catalyst comprises tetraoctylammonium bromide. It should be noted that other phase transfer catalysts can be used and the present invention is not limited to any particular phase transfer catalyst.

In one aspect, the organic solvent, catalytic metal precursor or aqueous solution thereof, and phase transfer catalyst are contacted. In various aspects, the resulting solution can be mixed, for example stirred, shaken, or sonicated so as to transfer the platinum ions or a portion thereof to the organic solvent. During and/or after transfer, a capping agent, such as, for example, 1-dodecanethiol can optionally be added to the solution. Other capping agents, such as, for example, alkanethiols with various length carbon chains (e.g., 3 to 25), can also be used, and the present invention is not intended to be limited to any particular capping agent. In various aspects, the capping agent, if used, can comprise a thiol, such as, for example, nonanethiol, decanethiol, undecanethiol, dodecanethiol, tridecanethiol, tetradecanethiol, pentadecanethiol, hexadecanethiol, heptadecanethiol, octadecanethiol, nonadecanethiol, isocanethiol, henicosanethiol, docosanethiol, tricosanethiol, tetracosanethiol, pentacosanethiol, or a combination thereof. In a specific aspect, a capping agent comprises dodecanethiol. In another aspect, a capping agent comprises octadecanethiol.

In one aspect, the selection of a particular capping agent or mixture of capping agents can provide varying performance properties for a fuel cell prepared from the resulting modified multiwalled carbon nanotube catalyst. For example, in one aspect, the use of an octadecanethiol capping agent can provide improved performance over a similar system using a dodecanethiol capping agent. Thus, in one aspect, the selection of a particular capping agent can improve the performance of a resulting electrode and/or fuel cell. While not wishing to be bound by theory, a longer chain alkane thiol compound can, in various aspects, provide improved performance over a comparable shorter chain alkane thiol compound.

In addition to, or in lieu of an alkane thiol, a capping agent can comprise a surfactant compound, such as, for example, sodium dodecyl sulfate (SDS), ammonium lauryl sulfate, or a combination thereof. In other aspects, other surfactant compounds or combinations of surfactant compounds can be used. In one aspect, a capping agent comprises one or more alkane thiol compounds. In another aspect, a capping agent comprises one or more alkane thiol compounds and does not comprise a surfactant. In another aspect, a capping agent comprises one or more alkane thiol compounds and one or more surfactant compounds. In still another aspect, a capping agent comprises one or more surfactant compounds and does not comprise an alkane thiol compound. Various combinations of capping agent compounds are intended to be covered in this disclosure, even if not specifically recited herein.

The concentration of the resulting metal solution can be any concentration suitable for obtaining the desired catalyst. In one aspect, the concentration of the solution can vary, depending upon the amount of MWCNT to be metallized and the target loading level. One of skill in the art could readily determine an appropriate metal concentration for the organic solvent for a specific application.

In one aspect, surface modified MWCNTs can be contacted with an organic solution containing the catalytic metal, such as, for example, a platinum containing toluene solution. In another aspect, the resulting mixture can be stirred, shaken, or otherwise mixed so as to ensure contact of the metal with the MWCNT surface.

In a specific aspect, the resulting mixture can be stirred for at least about an hour. In yet another aspect, during or subsequent to contacting, a capping agent, such as, for example, octadecanethiol, can be added to the solution and subsequently stirred.

In one aspect, after contacting, a reducing agent can be contacted with the MWCNTs. In various aspects, the reducing agent can comprise any reducing agent suitable for and/or compatible with the other components of the solution. In one aspect, the reducing agent comprises sodium formate. In one aspect, a reducing agent can comprise a formate, formic acid, sodium borohydride, hydrogen, hydrazine, hydroxyl amine, or a combination thereof. In other aspects, a reducing agent can comprise one or more compounds not specifically recited herein. One of skill in the art, in possession of this disclosure, could readily select an appropriate reducing agent. In one aspect, the reducing agent can be added dropwise to the solution. In another aspect, the reducing agent can be added under constant stirring. In yet another aspect, the reducing agent can be added while the MWCNT solution is maintained at a fixed temperature of, for example, about 60° C. It should be noted that the specific composition and concentration of a reducing agent can vary depending upon, for example, the amount of metal present, and the present invention is not intended to be limited to any particular composition or concentration of reducing agent.

In another aspect, after addition of the reducing agent, the resulting MWCNTs can be washed in a solvent, for example, ethanol and/or water, such as, for example, deionized water, to remove all or a portion of remaining capping agent and/or ligands remaining from the reaction thereof. In one aspect, the MWCNTs are washed with a solvent in which the capping agent and, for example, thiol ligand are soluble. In another aspect, washing is performed until no or substantially no capping agent and/or ligand remains on the MWCNTs.

In another aspect, after washing, the MWCNTs can optionally be dried, for example, in air, in an oven, under vacuum, or a combination thereof. In one aspect, the MWCNTs are vacuum dried at about 100° C. In yet another aspect, after drying, the MWCNTs can be heat treated, for example, for at least about 2 hours at about 800° C. It should be noted that the specific time and temperature of heat treatment can vary depending on, for example, the specific modification and chemicals used.

Citric Acid Concentration for MWCNTs Functionalization

In one aspect, the effect of surface modification of MWCNTs using citric acid (CA) was investigated by fabricating Pt/MWCNTs with and without a CA modification step.

Figure 2:
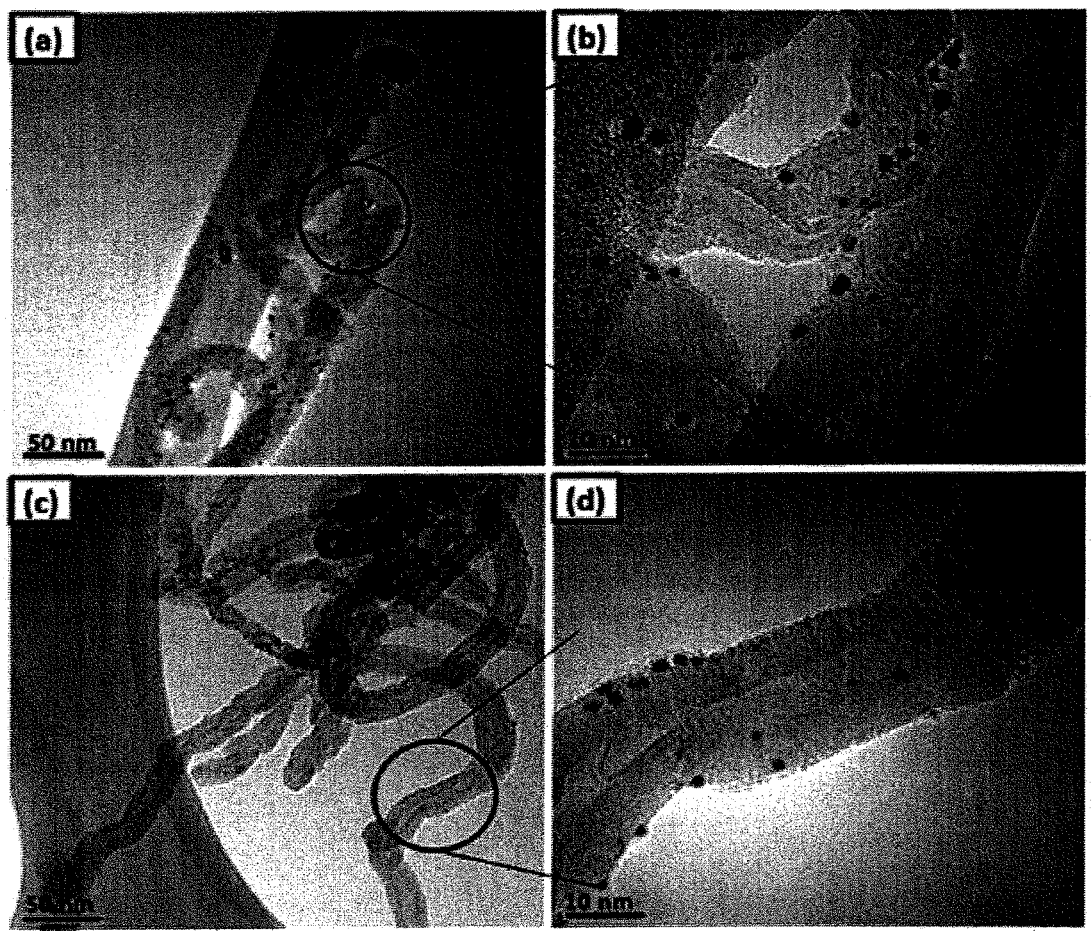
FIG. 2 illustrates high resolution transmission electron micrographs of Pt/MWCNTs at different magnifications: (a) and (b) from procedure 1, and (c) and (d) from procedure 2, in accordance with various aspects of the present disclosure.
Figure 3:
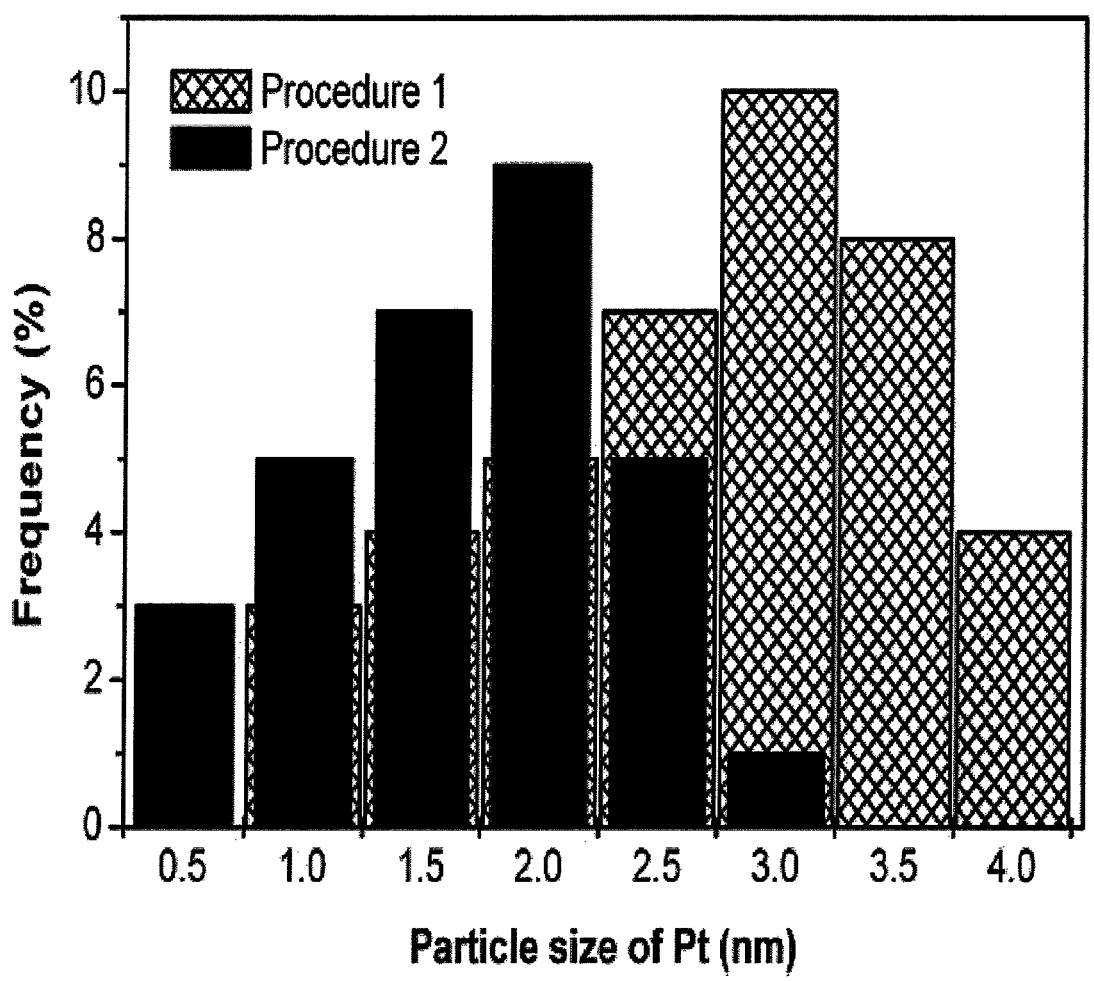
FIG. 3 illustrates the particle size distribution of Pt nanoparticles of Pt/MWCNTs made by procedures 1 and 2, in accordance with various aspects of the present disclosure.

In exemplary aspects, the synthesis approaches were termed as procedure 1: MWCNTs without citric acid treatment; and procedure 2: MWCNTs with citric acid treatment. With reference to the figures, FIG. 2 illustrates TEM images (at different magnifications) of the Pt/MWCNTs fabricated using the two procedures described above. In one aspect, Pt nanoparticles were uniformly distributed on the surface in both the synthetic approaches, but the Pt particle size was more uniform in case of CA modified MWCNTs compared to the unmodified MWCNTs. In one aspect, the statistical particle size distributions of the respective TEM images (FIGS. 2b & 2d) are illustrated in FIG. 3. The median particle size for the unmodified MWCNTs is in the range of 2.5-3.0 nm whereas that for the modified MWCNTs is 1.5-2.0 nm. Hence, in one aspect, surface modification of MWCNTs can contribute to decreasing the size of platinum particles as well as narrowing the size distribution range thereof. Effective control on the particle size and distribution can be beneficial for enhanced fuel cell performance, durability and reduction in cost of the fuel cell.

Figure 4:
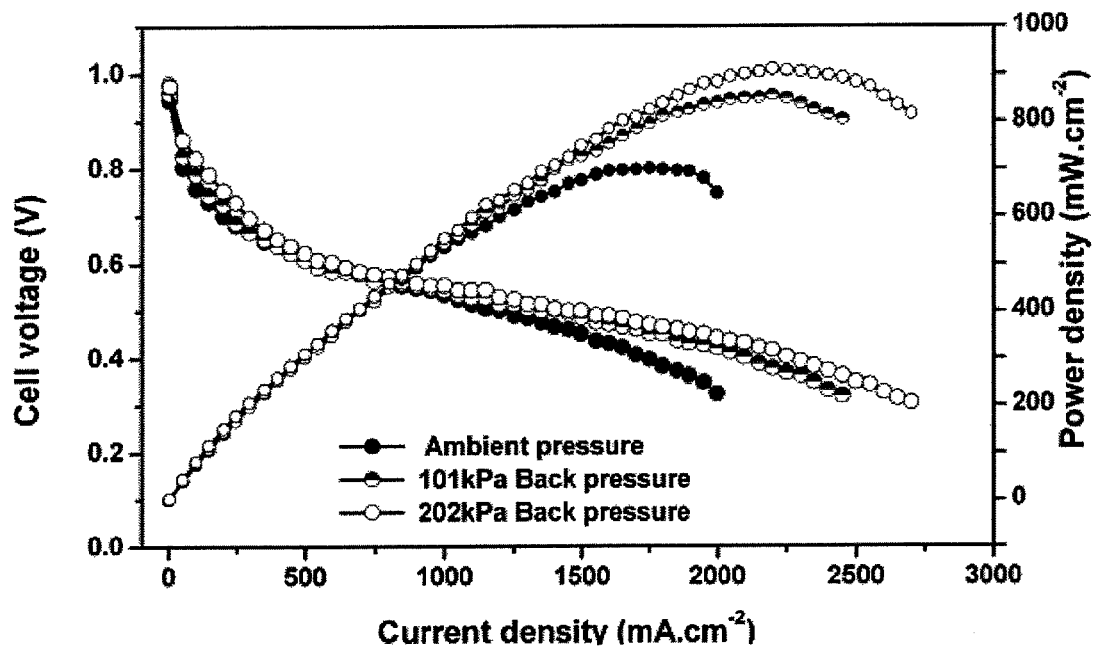
FIG. 4 illustrates fuel cell performance of an MEA with Pt/MWCNT nanoparticles prepared by procedure 1 at 80° C. using $H_2/O_2$ at various operating temperatures, in accordance with various aspects of the present disclosure.
Figure 5:
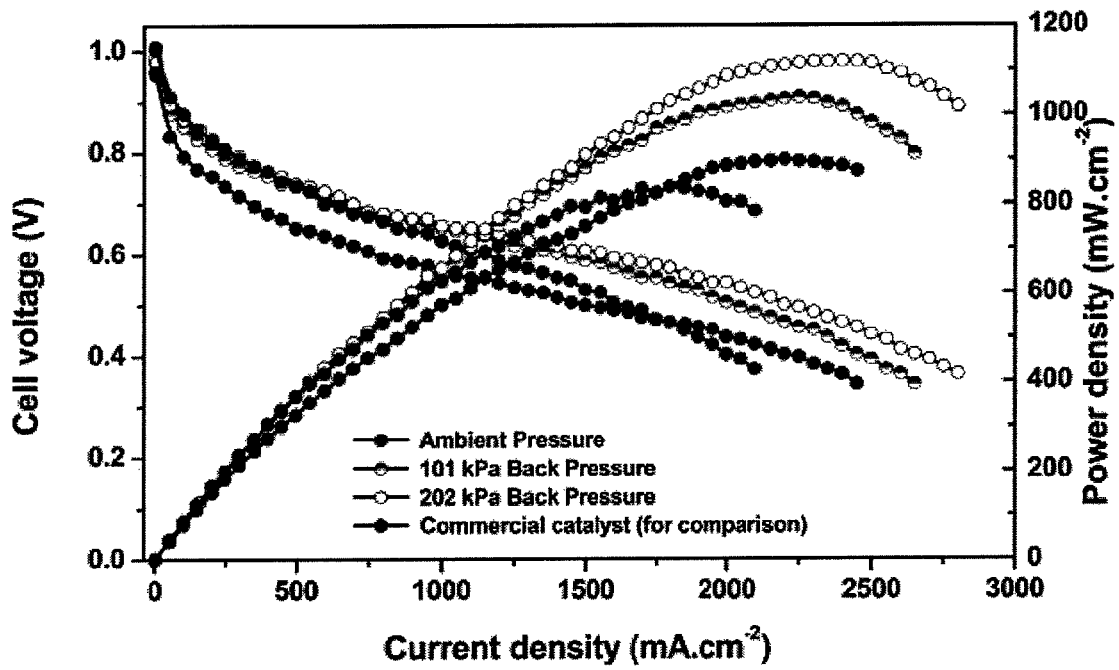
FIG. 5 illustrates fuel cell performance, of an MEA with Pt/MWCNT nanoparticles prepared by procedure 2 at 80° C. using $H_2/O_2$ at various operating temperatures, along with that for commercial Pt based cathodes at ambient temperature, in accordance with various aspects of the present disclosure.

FIG. 4 illustrates the single cell performance of samples fabricated using procedure 1 and 2, respectively at different back pressures. In one aspect, the surface modified MWCNTs exhibited improved fuel cell performance compared to that of the unmodified MWCNTs at a given back pressure. In such an aspect, the current densities at 0.4 V for modified and unmodified MWCNTs were 1,800 and 2,300 mA·cm$^{-2}$, respectively at 80° C. and ambient pressure. Moreover, the initial drop of cell voltage from the open circuit voltage (OCV) is large for unmodified MWCNTs, as compared to modified MWCNTs. The drop in OCV can be an indication of MEA activity. In such an aspect, the CA modification step can improve the activity of the MEA and resulting FC performance. FIGS. 4 and 5 illustrate fuel cell performance curves for nanocatalysts prepared according to procedures 1 and 2.

Figure 6:
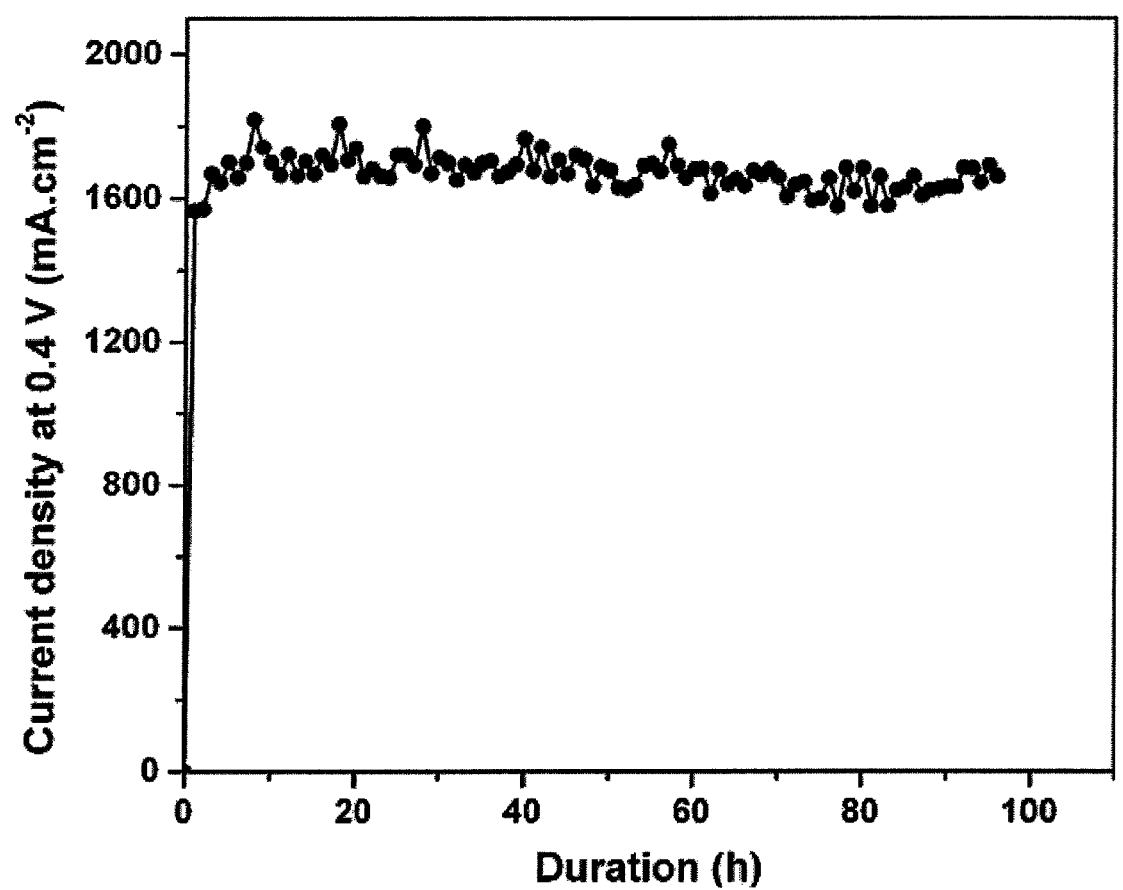
FIG. 6 illustrates the durability of an MEA with Pt/MWCNT nanoparticles prepared by procedure 2 at 80° C. using $H_2/O_2$, 100% RH and ambient temperature, in accordance with various aspects of the present disclosure.
Figure 7:
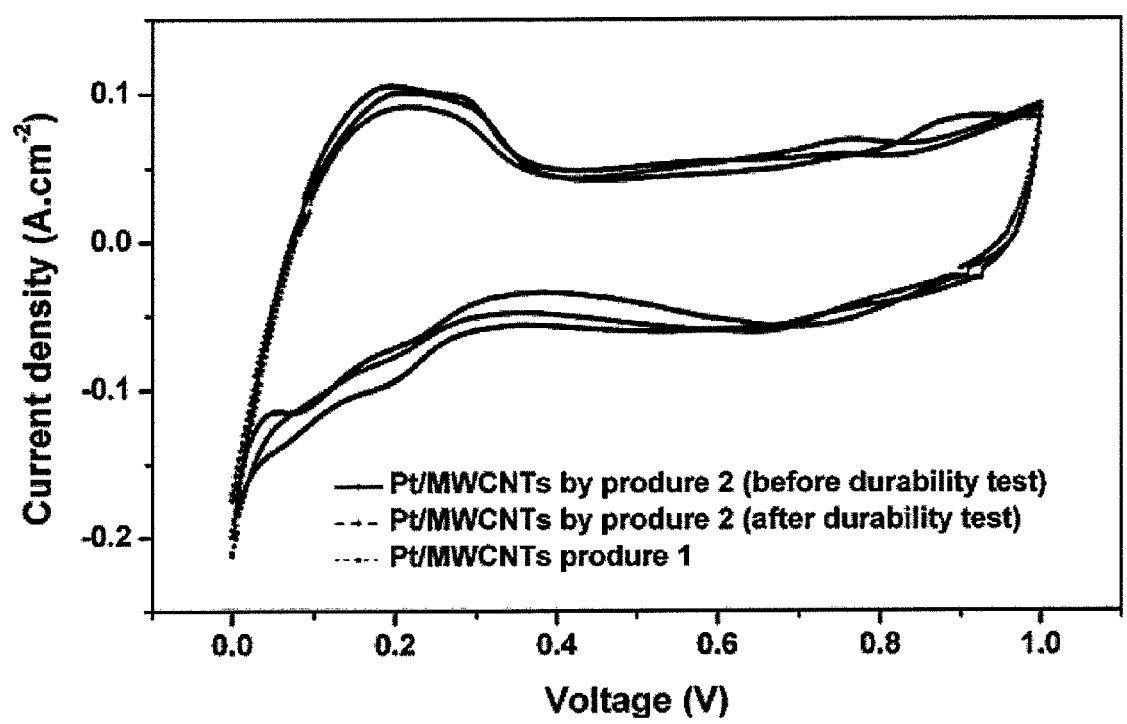
FIG. 7 illustrates cyclic voltammograms of MEAs prepared with Pt/MWCNT based catalysts prepared by procedures 1 and 2, in accordance with various aspects of the present disclosure.

FIG. 6 illustrates the durability of a single cell, with the MEA fabricated using procedure 2, for a period of 100 h. The current density data obtained at 1 h intervals at a constant cell voltage of 0.4 V, 80° C., 100% RH and ambient pressure. The current density was highly stable during the 100 h operation, although it was a very short time to assess the stability of MEA; it gave an indication of the high durability of the MEA. The electrochemical active area (ECSA) of the MEA with Pt/MWCNTs (procedure 2 with CA modification) measured before and after 100 h operation and MEA with Pt/MWCNTs (procedure 1 without CA modification) was calculated from the CV patterns shown in FIG. 7. ECSA was determined to be 64 $m^2 \cdot g^4$ for the Pt/MWCNTs made with CA modification (procedure 2 with CA modification), and remained unchanged after the durability test. The stable current density and unchanged ECSA of Pt nanocatalyst for 100 h were indications of the high stability of Pt/MWCNTs based MEA. The ECSA for MEA (procedure 1) was estimated as 53 $m^2 \cdot g^{-1}$. Thus, higher ECSA values can be obtained for the Pt/MWCNTs with CA (procedure 2), as compared to Pt/MWCNTs without CA.

Figure 8:
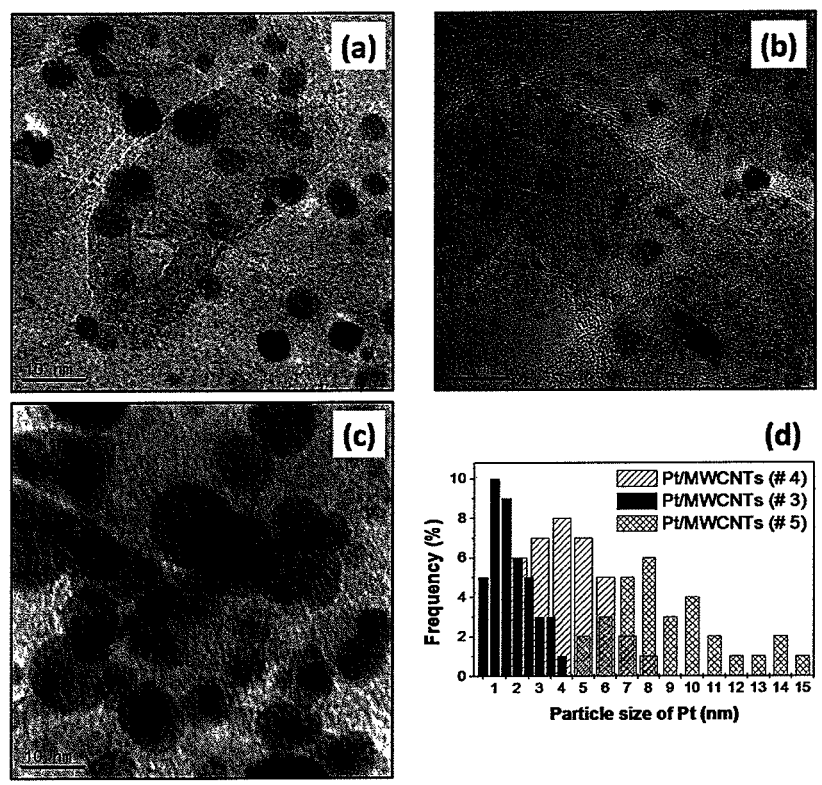
FIG. 8 illustrates HRTEM images of Pt/MWCNTs nanocatalysts treated with different CA concentrations (a) 0 (#4), (b) 1.6 (#3), (c) 3.2 mM (#5) and (d) the respective particle size distributions, in accordance with various aspects of the present disclosure.

In one aspect, functional groups on the surface of MWCNTs from CA modification can provide nucleation anchors for the attachment/deposition of Pt catalyst particles on MWCNTs surface. In one aspect, three samples of Pt/MWCNTs were prepared with CA concentrations of 0 mM, 1.6 mM, and 3.2 mM. FIG. 8 illustrates the high resolution TEM images and particle size distribution of Pt nanoparticles for samples each of these samples. FIG. 8(*b*) shows the smallest Pt particle size (mean: ~1.5 nm) while FIG. 8(*a*), prepared without any CA treatment, shows slightly larger particle size (~4 nm). While not wishing to be bound by theory, this indicates that, in one aspect, CA is driving the deposition of platinum particle on MWCNTs. In contrast, the sample with higher concentration of CA (3.2 mM) shows much larger particle size (mean: ~9 nm) due, in one aspect, to agglomeration of Pt nanoparticles. Thus, the concentration of citric acid can be a significant factor in controlling platinum particle size and producing efficient and high performing catalyst materials.

Figure 9:
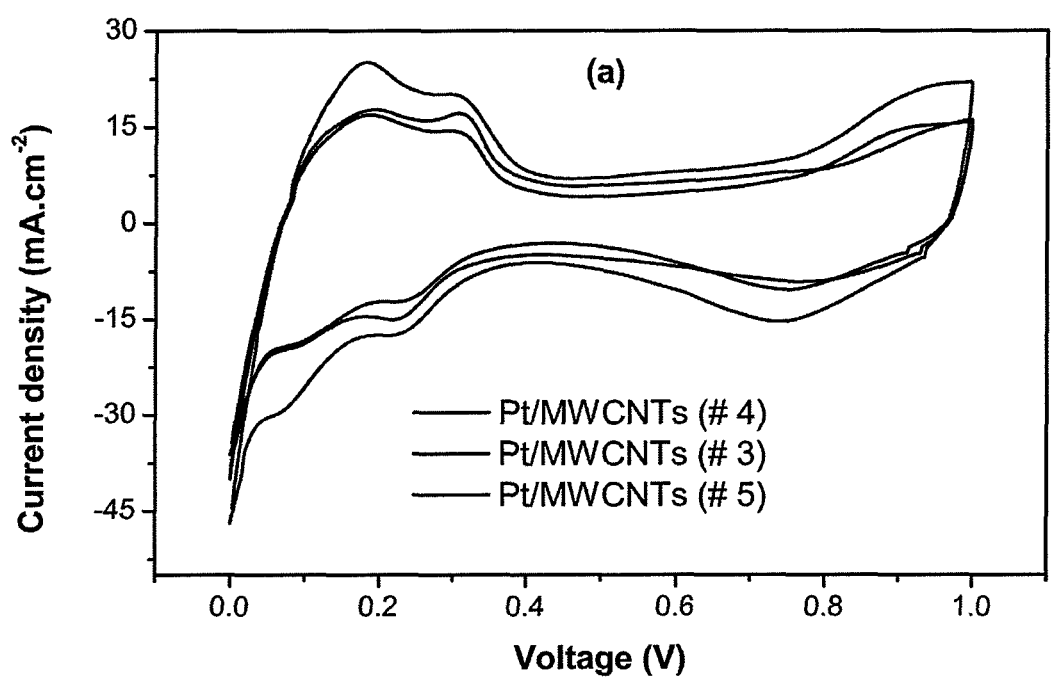
FIG. 9 illustrates (a) CV data (0 to 1 V with 50 mV·s$^{-1}$) at 30° C. using humidified $H_2/N_2$ gases
Figure 10:
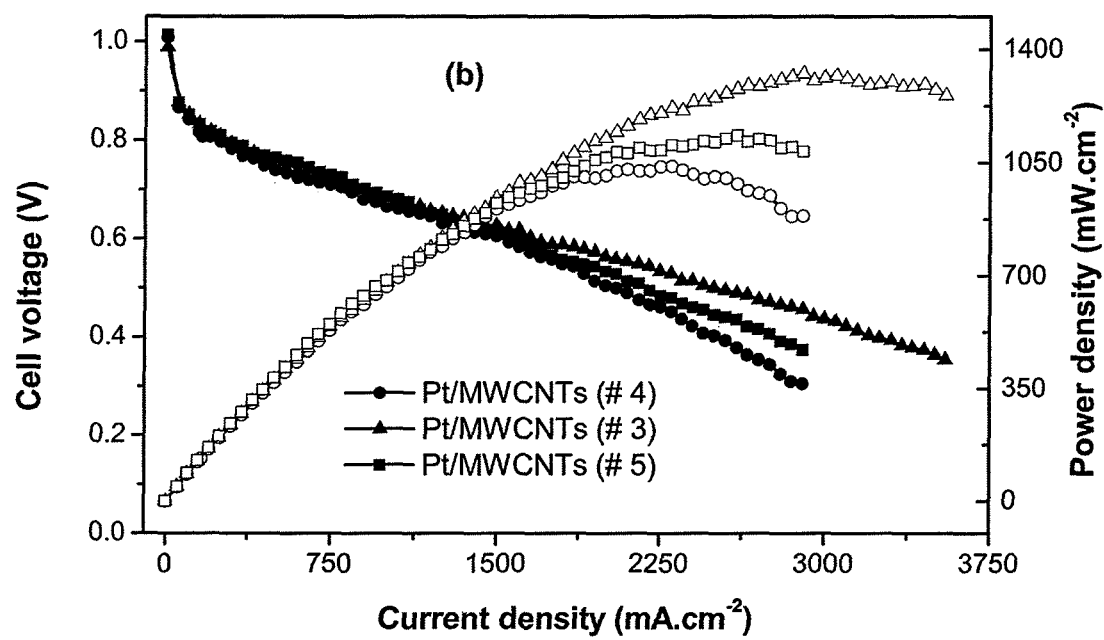
FIG. 10 illustrates (b) fuel cell performance at 80° C. ambient pressure with $H_2/O_2$ gases at 100% RH for MEAs with Pt/MWCNTs nanocatalysts prepared with different CA concentrations, in accordance with various aspects of the present disclosure.

FIG. 9 illustrates the CV (with humidified $H_2/N_2$ gases at room temperature) for MEAs fabricated with Pt/MWCNTs prepared with various CA concentrations. ECSA of these three samples as measured from the CV data (FIG. 9) are 84, 62 and 69 $m^2 \cdot g^{-1}$ Pt catalysts, respectively. The MEA with sample #3 has the highest ECSA with an indication of highest catalytic activity compared to samples #4 and 5. FIG. 10 gives the fuel cell performance of sample #3, 4 and 5. As expected, sample #3 exhibited the highest fuel cell performance compared to that of samples #4 and 5, with a peak power density value of about 1,320 $mW \cdot cm^{-2}$. Sample #5 with large particle size showed medium cell performance and #4 without CA treatment showed lowest ECSA and fuel cell performance. Hence other samples (#6 to 8) were subsequently prepared with 1.6 mM concentration of CA.

Composition of Capping Agent

Figure 11:
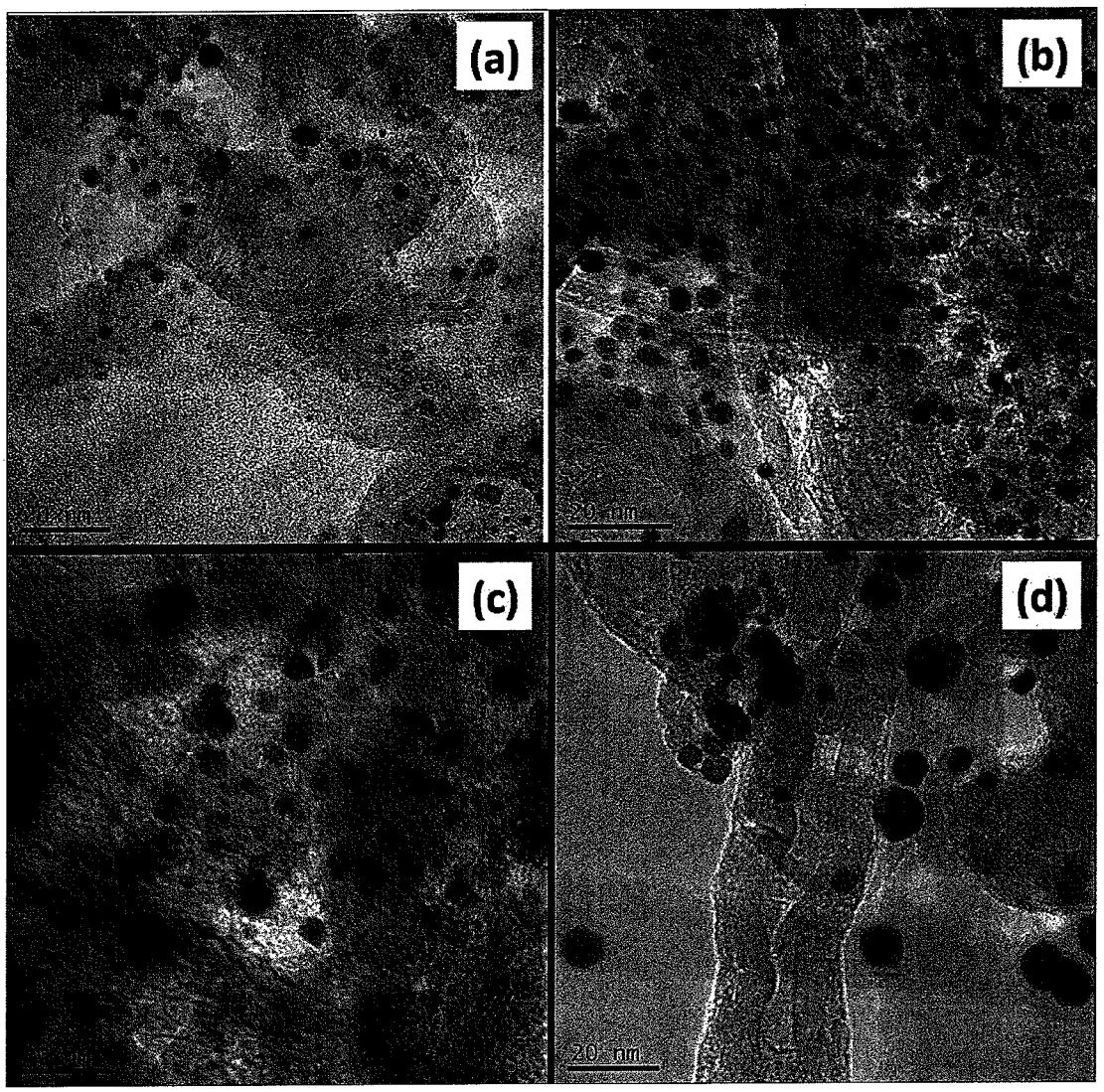
FIG. 11 illustrates HRTEM images of Pt/MWCNTs nanocatalysts synthesized with different ratios of DDT to Pt (a) #3, (b) #6, (c) #7 and (d) #8.
Figure 12A:
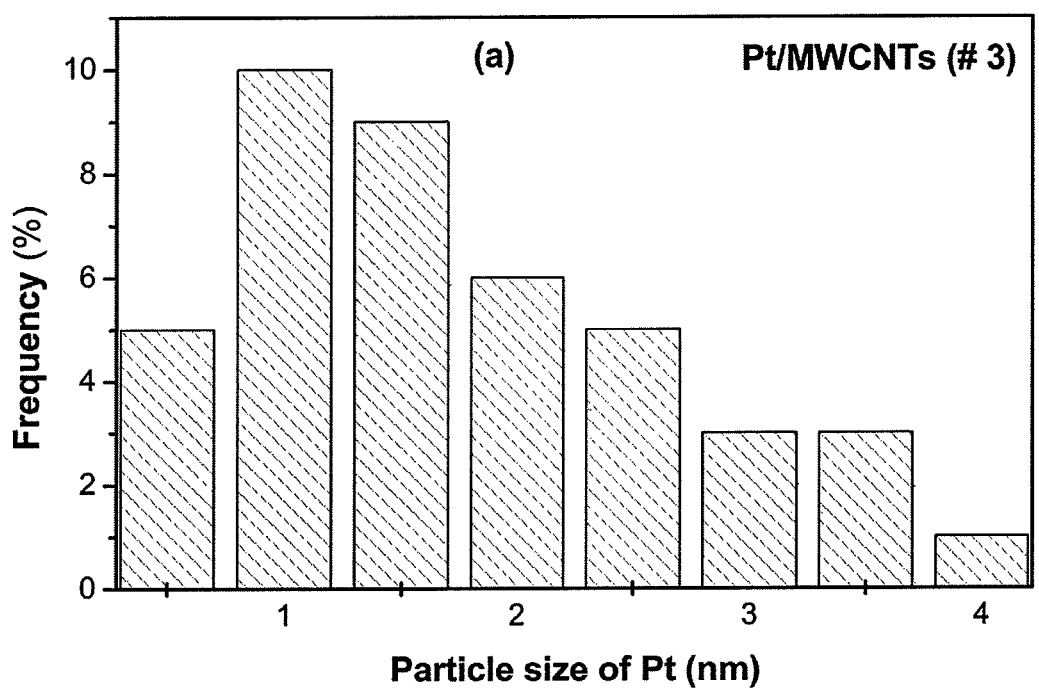
FIGS. 12(a-d) illustrate $P_t$ nanoparticle size distribution of Pt/MWCNTs synthesized with different ratios of DDT to Pt (a) #3, (b) #6, (c) #7 and (d) #8.
Figure 12B:
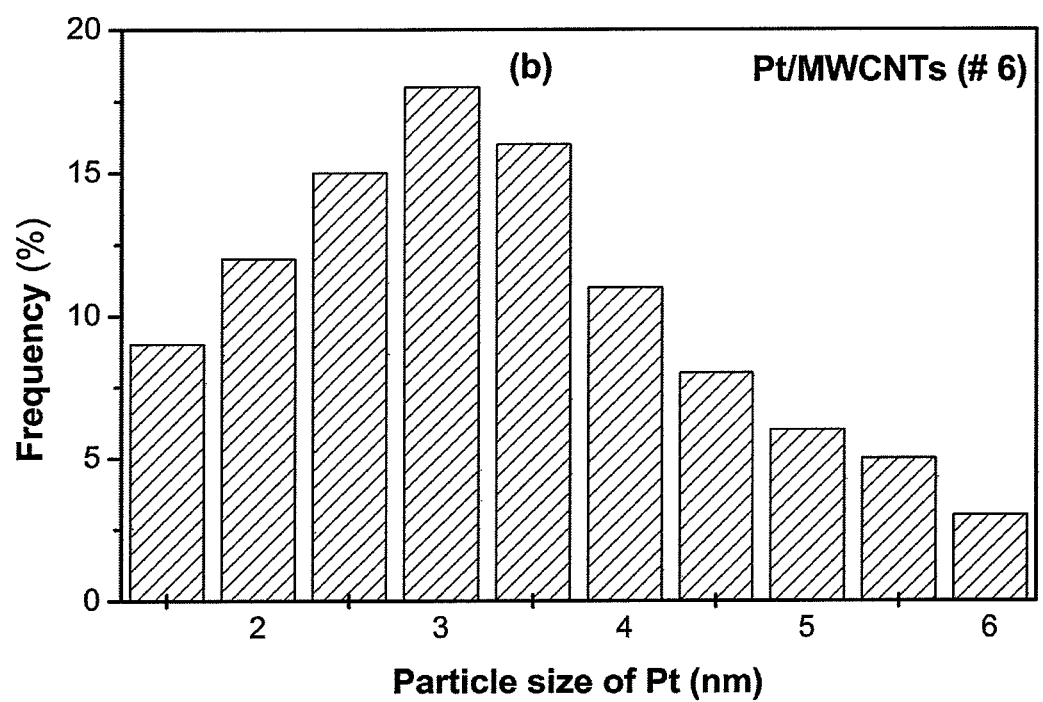
Figure 12C:
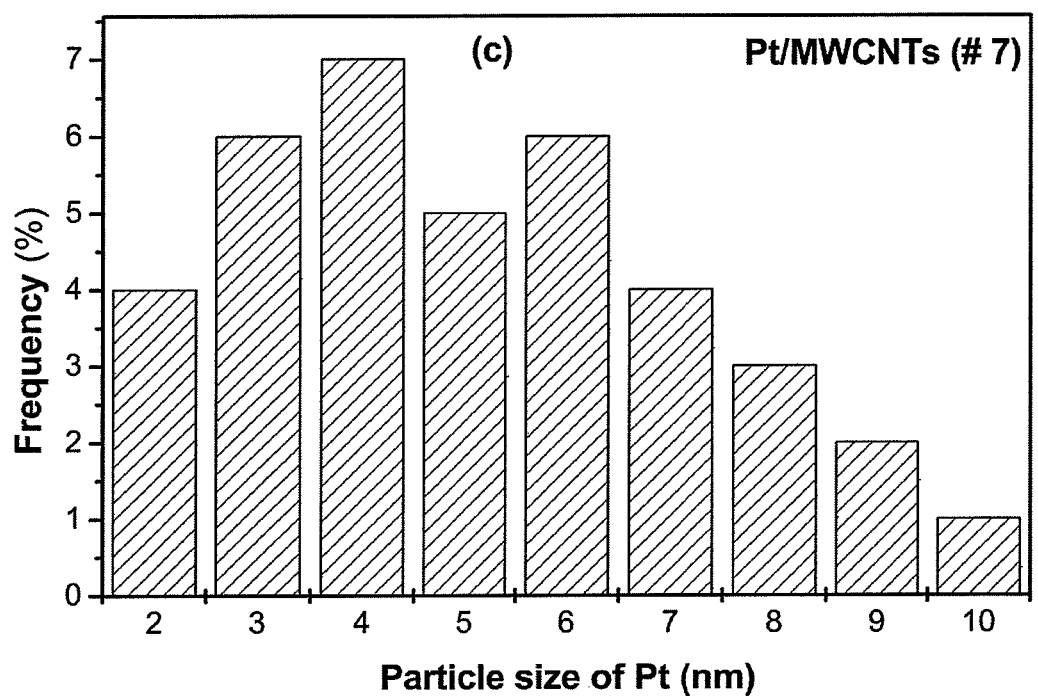
Figure 12D:
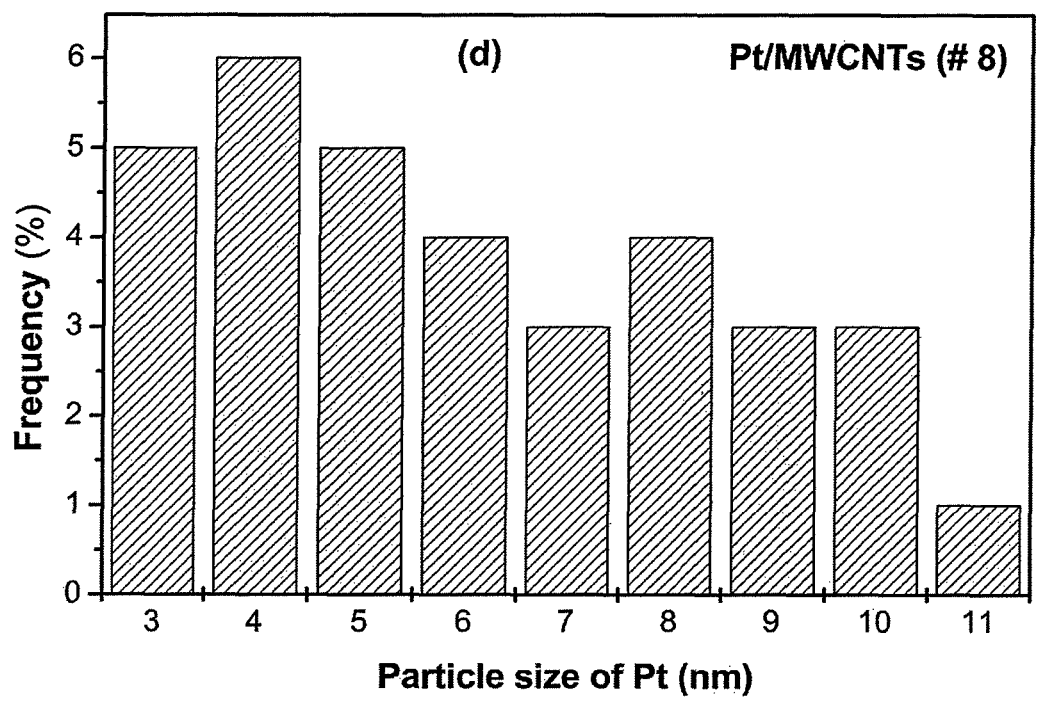

In one aspect, the coefficient n to m in reaction (2) determines the ratio of thiol ligand to platinum. In one aspect, four Pt/MWCNTs samples (#3, 6, 7 and 8) were prepared with four different molar ratios of a dodecanethiol capping agent to Pt (8:1, 2:1, 1:1 and 0.5:1). FIG. 11 compares the HRTEM images of these four samples (#3, 6, 7 and 8). As seen from FIG. 11, the capping agent to Pt ratio can substantially influence the particle size of Pt. FIG. 12(*a*) to (*d*) illustrates the statistical distribution of Pt particle size of the samples #3, 6, 7 and 8, respectively. In one aspect, the molar ratio of capping agent to Pt can not only directly control the particle size of platinum, but can also affect the distribution of Pt nanoparticles on MWCNTs. In another aspect, higher ratios of capping agent to Pt can yield smaller particles formed on MWCNTs. In yet another aspect, a smaller ratio of capping agent to Pt (sample #8) can result in smaller particles aggregating into larger particles. In one aspect, the distribution of Pt nanoparticles is highly homogenous with a mean size of ~1.5 and 3 nm, respectively on MWCNTs.

Figure 13:
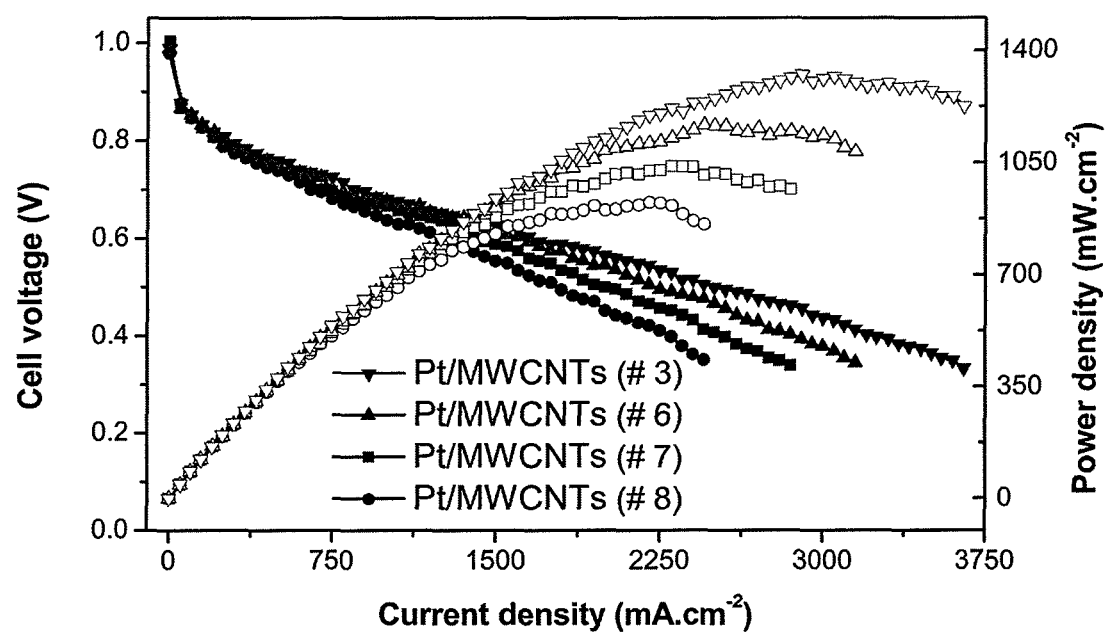
FIG. 13 illustrates the performance of PEMFC with Pt/MWCNTs nanocatalysts samples #3, 6, 7 and 8 at 80° C. ambient pressure with $H_2/O_2$ gases at 100% RH.

FIG. 13 compares the PEMFC performance with $H_2/O_2$ gases at ambient pressure, of the MEAs made with Pt/MWCNTs samples #3, 6, 7 and 8 synthesized with various molar ratios of capping agent to Pt. In one aspect, as the molar ratio of capping agent to Pt increases, the fuel cell performance also increases. Sample #3 illustrated the best performance compared to samples #6, 7 and 8. For example, sample #3 exhibited a peak power density of about 1,350 $mW \cdot cm^{-2}$ at ambient pressure, and about 1,520 $mW \cdot cm^{-2}$ at 202 kPa back pressure.

Sintering Temperature

In one aspect, thiol-derviatized metal nanoparticles can be handled and characterized as simple and stable chemical compounds. In another aspect, such thiol-derivatized metal nanoparticles can comprise waxy textures after drying. In such an aspect, the thiol ligand or a portion thereof can be removed prior to or during formation of the Pt/MWCNT nanocatalyst. In various aspects, the sintering temperature to remove all or a portion of the thiol-ligand can be any temperature suitable for removing the ligand. In one aspect, the time and temperature necessary to remove all or a portion of a ligand can vary, depending upon, for example, the specific ligand, metal, and degree of derivatization. In other aspects, the sintering temperature can be from about 300° C. to about 800° C., for example, about 300° C., 500° C., or about 800° C. In other aspects, the sintering temperature can be less than about 300° C. or greater than about 800° C., and the present invention is not intended to be limited to any particular sintering temperature.

Figure 14:
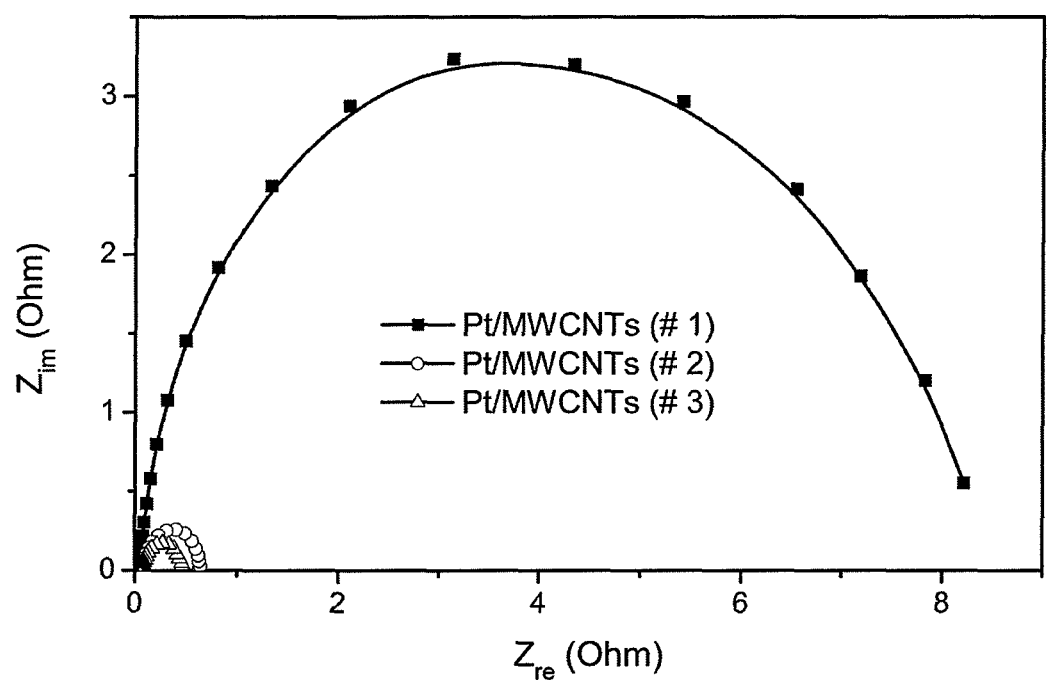
FIG. 14 illustrates electrochemical impedance spectroscopy data of MEAs with Pt/MWCNTs catalysts sintered at three different temperatures (300, 500 and 800° C. in argon atmosphere) with humidified $H_2/O_2$ gases (sweeping frequency: 10 kHz to 0.1 mHz at cell open circuit voltage), in accordance with various aspects of the present disclosure.

In one aspect, three individual samples were sintered at 300° C., 500° C., and 800° C., respectively. The CA concentration and capping agent:Pt ratio were kept constant in for each of these samples. Three MEAs were then prepared with the respective Pt/MWCNTs and evaluated in a PEMFC. The internal impedance (EIS method) of each of the MEAs with $H_2/O_2$ gases at room temperature are illustrated in FIG. 14. In FIG. 14, the single semicircle loop indicates the interfacial kinetics of the cell and the diameter of the semicircle loop reveals the charge transfer resistance of the cell. The MEA with the 800° C. sintered sample had the smallest diameter of semicircle loop, indicating the lowest charge transfer resistance (0.47Ω) as compared to other two samples.

Figure 15:
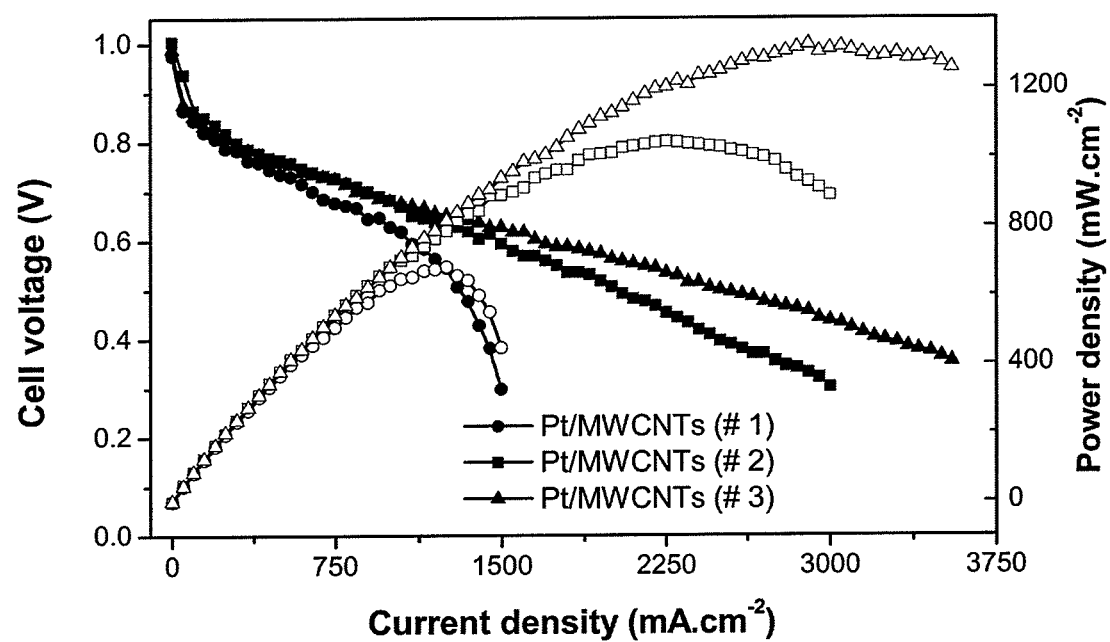
FIG. 15 illustrates fuel cell performance of MEAs with Pt/MWCNTs catalysts sintered at different temperatures, using $H_2/O_2$ gases at 100% RH at 80° C., ambient pressure, in accordance with various aspects of the present disclosure.

FIG. 15 illustrates the single cell performance of Pt/MWCNTs sintered at 300° C., 500° C., and 800° C., respectively, with $H_2/O_2$ gases at 100% RH at 80° C. using NAFION® 212 as an electrolyte. As can be noted from the figure, the cell with Pt/MWCNTs catalyst heat treated at 300° C. exhibits much lower performance compared to other samples. While not wishing to be bound by theory, this may be due to remaining thiol ligand and impurities of the Pt/MWCNTs increasing the internal impedance. The MEA with Pt/MWCNTs sample heat treated at 800° C. exhibited the best performance (peak power density of about 1,320 $mW \cdot cm^{-2}$).

Fuel Cell Performance and Durability Comparison

Figure 16:
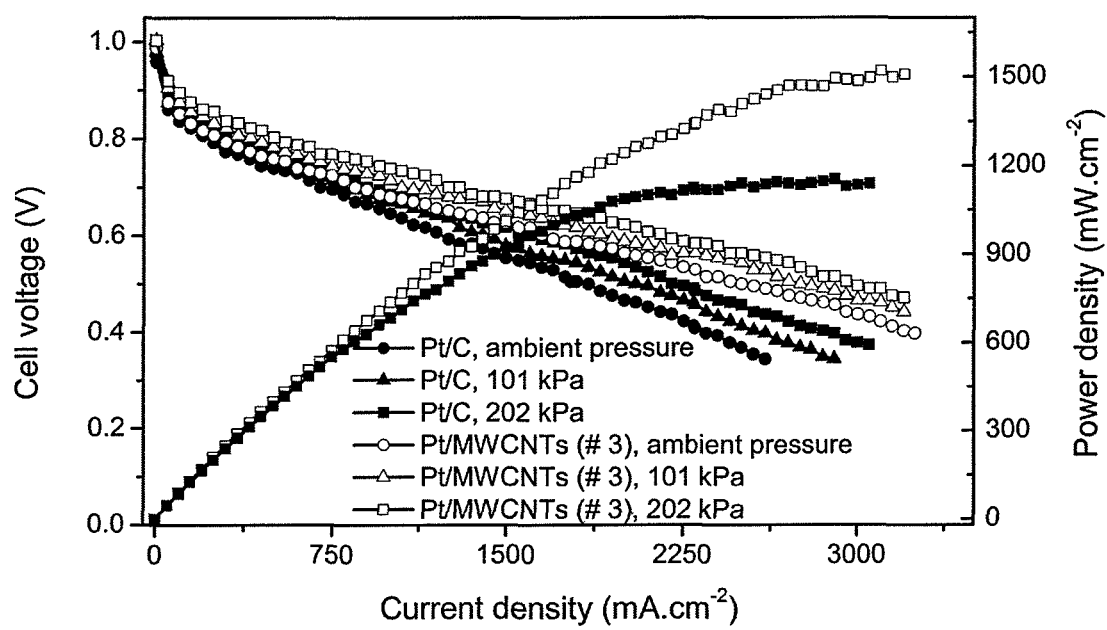
FIG. 16 illustrates the fuel cell performance comparison of Pt/MWCNTs nanocatalyst samples #3 with commercial Pt/C catalyst at 80° C. with $H_2/O_2$ gases at 100% RH at different operating pressures.

FIG. 16 compares fuel cell performance of MEAs prepared with an inventive Pt/MWCNTs nanocatalyst (sample #3) and a commercial Pt/C catalyst at 80° C. using $H_2/O_2$ gases at various operating pressures. In one aspect, the fuel cell performance of the MEA using the inventive Pt/MWCNTs increased to a greater extent at higher pressure compared to that of the commercial Pt/C catalyst.

Figure 17A:
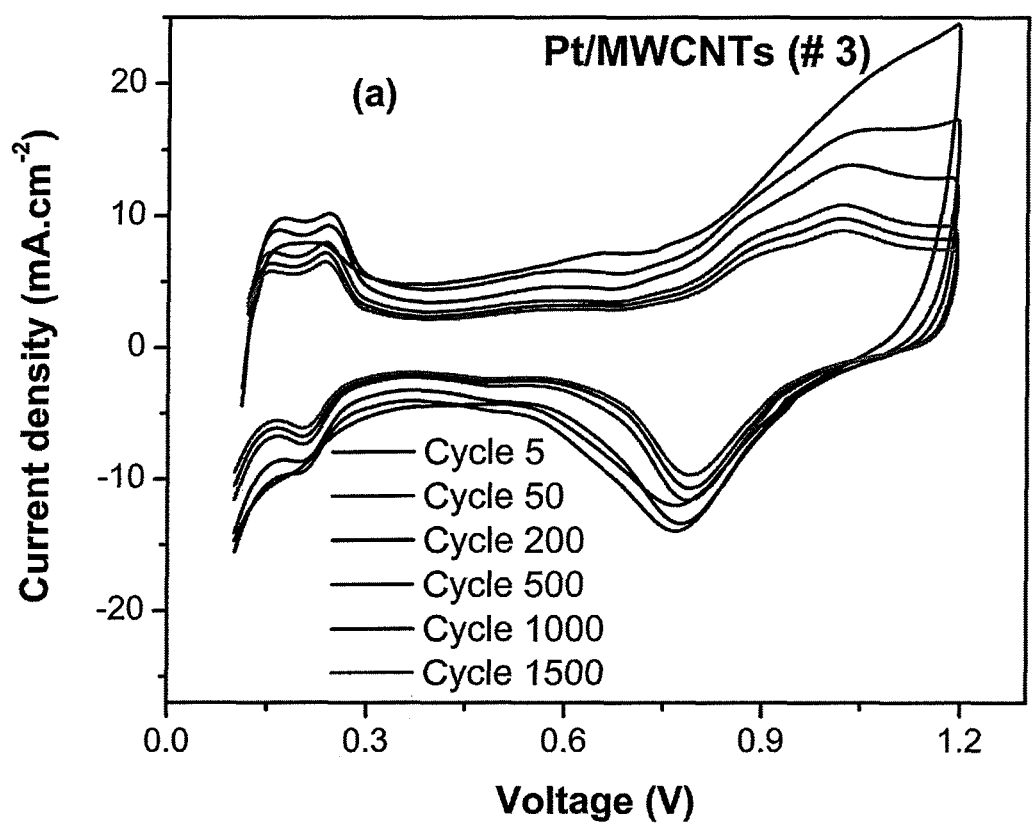
FIG. 17(a-c) illustrates potential cycles data (0.1-1.2 V, 50 mV·s$^{-1}$) of samples (a) #3, (b) #6, (c) commercial Pt/C catalysts at 80° C. with humidified $H_2/N_2$ gases
Figure 17B:
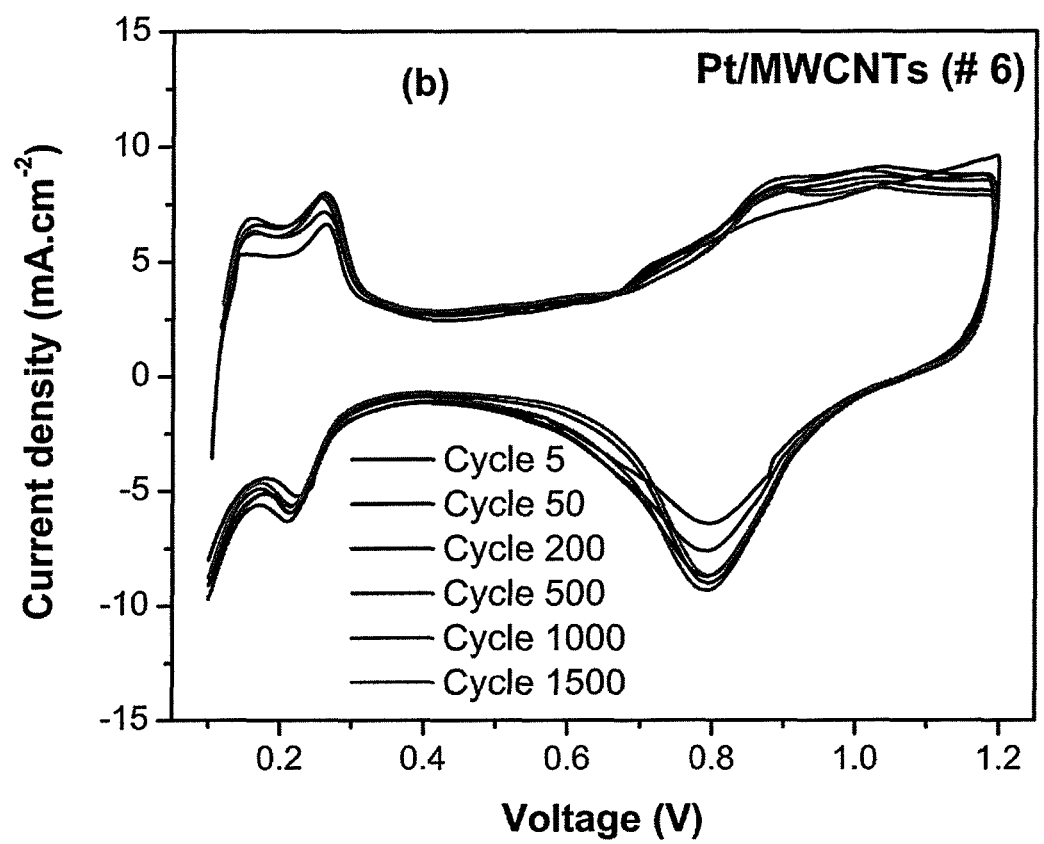
Figure 17C:
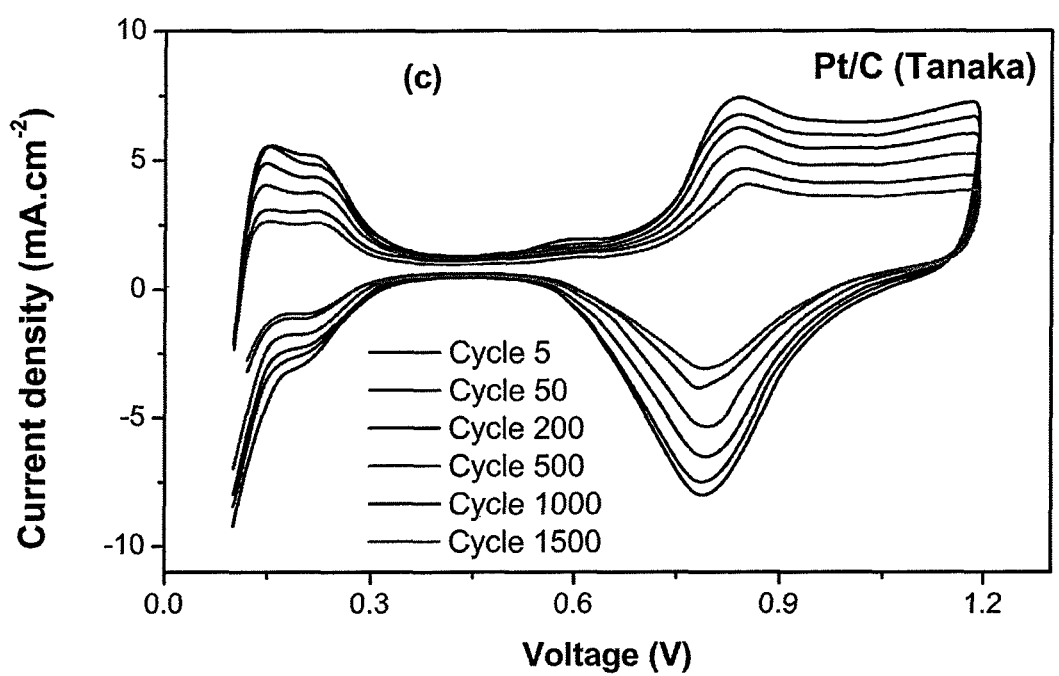
Figure 18:
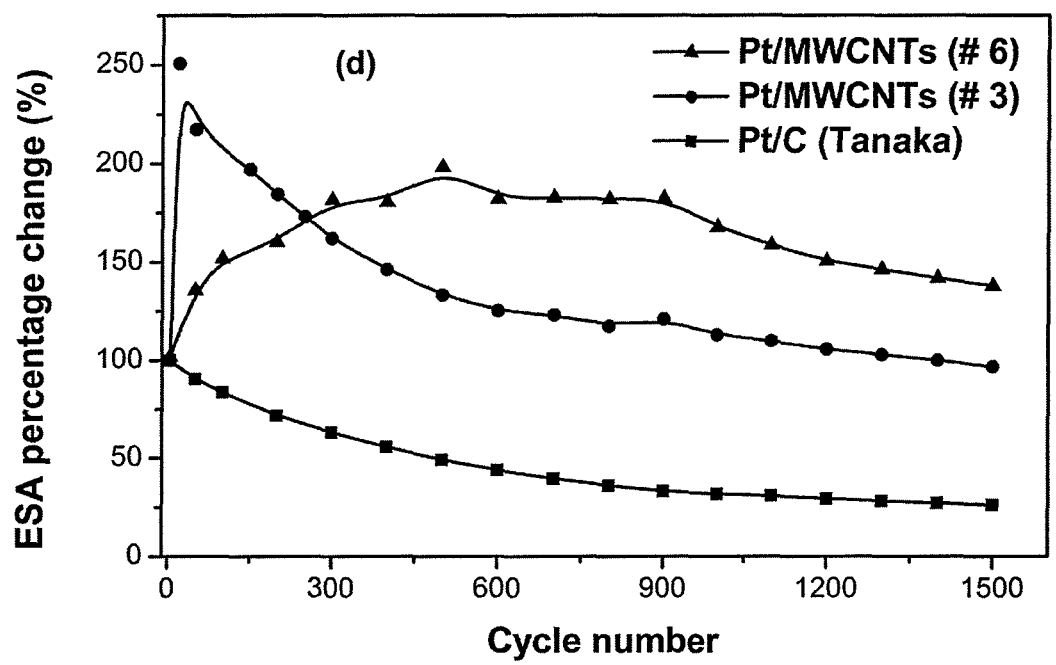
FIG. 18 illustrates changes in electrochemical surface area.

In one aspect, FIGS. 17(*a*) to (*c*) illustrate accelerated durability data obtained by CV, for up to 1500 potential cycles in the range of 0.1 to 1.2 V at a scan rate of 50 mV·s' for the Pt/MWCNTs samples #3, 6 and the commercial Pt/C catalysts, respectively. In such an aspect, sample #6 exhibited better stability than sample #3. In contrast, the CV profiles in FIG. 17(c), continually diminished with each cycle for the commercial Pt/C catalyst. In one aspect, the ECSA values of the commercial Pt/C catalyst diminished dramatically, especially during the first 200 cycles. In another aspect, the ECSA change over 1,500 cycles for the Pt/MWCNTs samples #3 and 6 is not significant compared to that of the commercial Pt/C catalyst (ECSA loss is about 75%), as illustrated in FIG. 18. In another aspect, for samples #3 (particle size: ~1.5 nm) and 6 (particle size: ~3 nm), the ECSA values after 1500 cycles remained well above their respective initial values. In yet another aspect, the inventive Pt/MWCNTs nanocatalysts are highly durable compared to commercial Pt/C catalyst.

Figure 19:
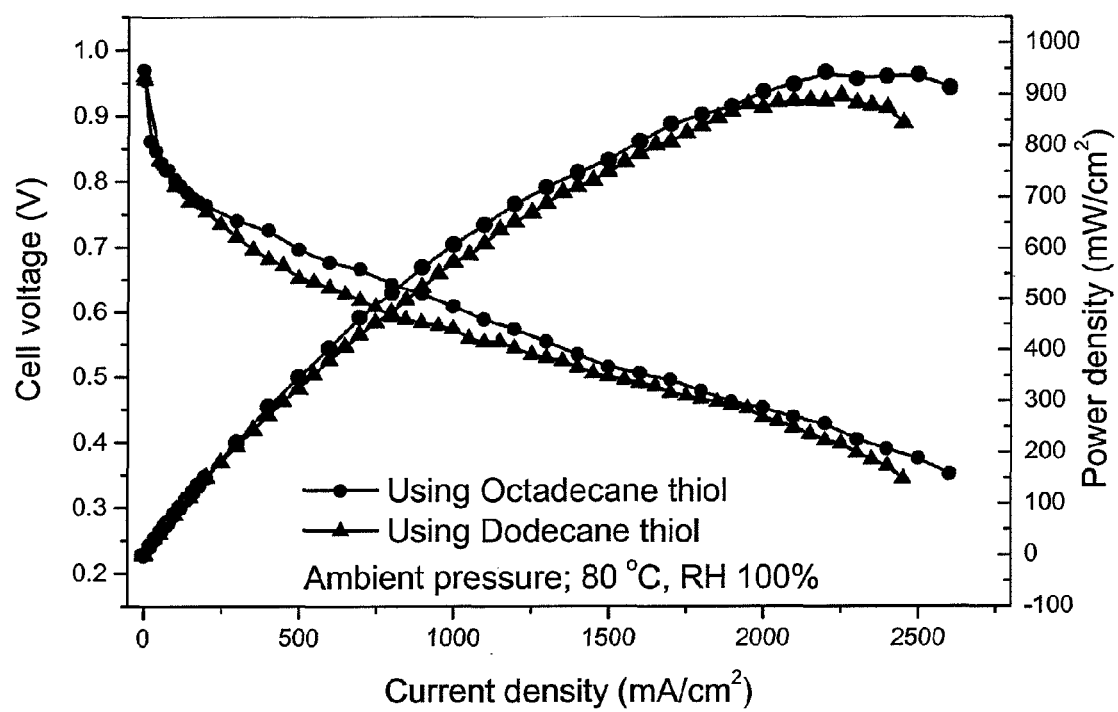
FIG. 19 illustrates fuel cell performance of Pt/MWCNTs synthesized using different capping agents.

The effect of varying the capping agent is illustrated in FIG. 19, wherein the power density of a cell prepared using an octadecanethiol capping agent was superior to that prepared using a dodecanethiol capping agent. Thus, a capping agent can be selected for a given catalyst system and/or MEA structure that can provide improved power density and performance.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

In the following examples, MWCNTs (OD 20-30 nm, purity >95%, ash content <1.5%) were obtained from Cheaptubes Co., citric acid (CA) from Spectrum Chemicals, hexachloroplatinic acid ($H_2PtCl_6 \cdot 6H_2O$), tetraoctylammonium bromide (ToAB, $N(C_8H_{17})_4Br$), toluene ($C_6H_5CH_3$), 1-dodecanethiol ($C_{12}H_{25}SH$, 98%), and octadecanethiol from Sigma-Aldrich.

Example 1

Preparation of Platinum Solution

In a first example, various platinum containing organic solutions were prepared. A first solution was prepared by mixing choroplatinic acid (3 ml of 0.08 M in DI water) in ToAB (4 ml of 0.18 M in toluene). The mixture was then vigorously stirred until the $PtCl_6^{2-}$ separated from the aqueous phase into the organic (toluene) layer. The organic layer was then extracted and 450 mg of 1-dodecanethiol (DDT) capping agent was added and stirred for 30 min.

A second solution was prepared by mixing aqueous chloroplatinic acid (133 mg in 3 cc DI water, orange colored) solution with ToAB (445 mg in 4 cc toluene) and vigorously stirring for about 30 min at room temperature. During this process, $PtCl_6^{2-}$ ions were transferred from the aqueous solution to the toluene phase with ToAB as the phase-transfer catalyst. The orange colored toluene layer was then extracted

Example 2

Modification of MWCNT Surface

In a second example, carboxylic acid functionalization of MWCNTs was performed using citric acid. About 200 mg of MWCNTs was added to an aqueous citric acid solution (500 mg of citric acid powder in 3 cc deionized (DI) water) and subjected to 15 min ultrasonic treatment followed by a vigorous stirring for 1 h using magnetic stirrer.

The solvent was removed by filtering and the MWCNTs were heat treated in a muffle furnace at 300° C. for 30 min. This treatment improved the wetting characteristics of the MWCNTs by incorporating —COOH functional groups on the surface. These groups act as anchors for metal deposition.

A separate group of MWCNTs were modified by adding 3 ml of a 1.6 M aqueous citric acid solution to 200 mg of the MWCNTs, allowing to stand overnight at room temperature, and then heat treating the resulting solution at 300° C. for 30 minutes in air.

Example 3

Synthesis of Pt/MWCNT Nanocatalysts

In a third example, surface modified MWCNTs from the examples above, were contacted with the organic layers prepared in Example 1. The modified MWCNTs were added to the organic solution with constant stirring for 1 hour, after which 550 mg of 1-dodecanethiol was added and the resulting solution stirred for another 30 minutes.

Aqueous sodium formate, for example, 10 ml of 0.25 M, was then added by dropwise addition at 60° C. under continued stirring for about 2 hours. The solid product was filtered and rinsed with both ethanol and warm DI water to remove the remains of the capping agent and reducing agent, respectively.

The resulting Pt/MWCNTs product was vacuum dried at 100° C. and heat treated for 2-3 h at 800° C. in a tubular furnace in flowing argon atmosphere.

Example 4

Optimization of Citric Acid Concentration

In a fourth example, eight experiments were designed for optimizing the citric acid concentration, ratio of capping agent (DDT) to Pt, and sintering temperature, as illustrated in Table 1, below. In each of the experiments, the amount and concentration of ToAB (4 ml of 0.18 M in toluene) and sodium formate (10 ml of 0.25 M) were kept identical. The molar ratio of ToAB to platinum ion to sodium formate is maintained as 3.2:1:20.

TABLE 1

Experimental details of Pt/MWCNTs nanocatalyst optimization

| | Parameter | | |
|---|---|---|---|
| Sample # | CA concentration (mM) | Molar ratio of DDT to Pt (n/m ratio) | Sintering temperature (° C.) |
| 1 | 1.6 | 8:1 | 300 |
| 2 | 1.6 | 8:1 | 500 |
| 3 | 1.6 | 8:1 | 800 |
| 4 | 0 | 8:1 | 800 |
| 5 | 3.2 | 8:1 | 800 |

TABLE 1-continued

Experimental details of Pt/MWCNTs nanocatalyst optimization

| Sample # | Parameter | | |
|---|---|---|---|
| | CA concentration (mM) | Molar ratio of DDT to Pt (n/m ratio) | Sintering temperature (° C.) |
| 6 | 1.6 | 2:1 | 800 |
| 7 | 1.6 | 1:1 | 800 |
| 8 | 1.6 | 0.5:1 | 800 |

Example 5

Characterization of Pt/MWCNT Nanocatalysts

In a fifth example, the particle size and distribution of the deposited platinum particles on the MWCNTs were examined, together with the morphology thereof using high resolution transmission electron microscopy (HRTEM, Philips CM200-FEG), wherein Pt/MWCNTs were dispersed in methanol and applied on a lacy carbon grid for TEM characterization.

Example 6

Electrode Preparation and Characterization

In a sixth example, fuel cell electrodes were fabricated using the Pt/MWCNT materials. A catalyst ink was made by adding isopropyl alcohol (IPA) and Nafion dispersion (20 ml IPA and 10 ml of 5 wt. % Nafion to 1 g electrocatalyst) to Pt/MWCNT nanocatalyst (20 wt. % Pt on MWCNTs) under inert atmosphere. Catalyst coated membranes (CCM) was prepared by micro-spraying the catalyst ink on Nafion-212 electrolyte membrane (NRE 212, Ion Power Inc., New Castle, Del., USA) with 0.2 and 0.4 mg Pt·cm$^{-2}$ on anode and cathode, respectively. The CCM was vacuum dried at 70° C. for 15 min.

The MEA was assembled in a single PEMFC test cell (Fuel Cell Technologies Inc, NM, USA) with gas diffusion layers (GDLs) (fabricated by wire rod coating process) on both sides. CCMs were also fabricated with identical catalyst loading (0.2 and 0.4 mg Pt·cm$^{-2}$ on anode and cathode, respectively) using commercial Pt/C catalyst (TEC10EA50E, TKK, Japan) for comparison purposes. The MEAs were evaluated by using a Greenlight Test Station (G50 Fuel cell system, Hydrogenics, Vancouver, Canada) at 80° C., and at 90% and 100% relative humidity (RH) and various back pressures with $H_2/O_2$ gases. The gas flow rates were fixed at 200 and 400 SCCM for $H_2$ and $O_2$, respectively. The durability of the Pt catalysts (Pt/MWCNTs and Pt/C) was evaluated by potential cycling between 0.1 and 1.2 V at 50 mV·s$^{-1}$ scan rate at 80° C. with humidified $H_2/N_2$ gases by using a EG&G PARSTAT-2273 potentiostat-galvanostat. It should be noted that the MEAs with inventive Pt/MWCNTs nanocatalysts did not show any significant change in ECSA when cycled between 0.1 and 1 V, and hence the upper voltage was increased to 1.2 V. The impedance of the PEMFC was also evaluated by PARSTAT with the sweeping frequency range of 10 kHz to 0.1 mHz at room temperature and open circuit voltage of the cell.

Example 7

Electrochemical Characterization of Pt/MWCNTs

In a seventh example, fuel cell durability testing was carried out at 0.4 V, 80° C., with 100% RH and ambient pressure for 100 h. Cyclic voltammetry (CV) was carried out for measuring electrochemical active surface area (ECSA) of Pt catalyst using a EG&G 2273 PARSTAT potentiostat-galvanostat. The cell was equilibrated for about 2 h with humidified $H_2$ and $N_2$ gases at 30° C. prior to voltage scanning. ECSA was determined before and after the durability test.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for preparing a fuel cell catalyst, the method comprising contacting a surface modified multiwalled carbon nanotube with a platinum containing precursor disposed in an organic solvent; wherein the platinum containing precursor is prepared from an aqueous solution comprising a platinum containing compound and a phase transfer catalyst.

2. The method of claim 1, further comprising contacting a multiwalled carbon nanotube with an acid to produce the surface modified multiwalled carbon nanotube.

3. The method of claim 2, wherein the acid comprises citric acid.

4. The method of claim 1, wherein after contacting with a platinum containing precursor, the surface modified multiwalled carbon nanotube is contacted with a reducing agent.

5. The method of claim 4, wherein the reducing agent comprises one or more of sodium formate, formic acid, sodium borohydride, hydrogen, hydrazine, hydroxyl amine, or a combination thereof.

6. The method of claim 4, wherein the surface modified multiwalled carbon nanotube is further contacted with a capping agent.

7. The method of claim 6, wherein the surface modified multiwalled carbon nanotube is contacted substantially simultaneously with the reducing agent and the capping agent.

8. The method of claim 6, wherein the capping agent comprises a thiol endgroup.

9. The method of claim 6, wherein the capping agent comprises an alkanethiol.

10. The method of claim 6, further comprising heat treating the multiwalled carbon nanotube after contacting with the platinum containing precursor.

11. The method of claim 10, wherein after heat treating, no or substantially no capping agent is present on the multiwalled carbon nanotube.

12. The method of claim 1, wherein the surface modified multiwalled carbon nanotube has an external diameter of from about 10 nm to about 50 nm.

13. The method of claim 1, wherein the surface modified multiwalled carbon nanotube has an ash content of less than about 3 wt. %.

14. The method of claim 1, wherein the platinum containing precursor comprises $PtCl_6^{2-}$.

15. The method of claim 1, wherein the phase transfer catalyst comprises tetraoctylammonium bromide.

16. A multiwalled carbon nanotube supported platinum catalyst comprising:
a plurality of platinum nanoparticles having an average particle size of from about 1 nm to about 3 nm; and an electrochemical surface area of at least about 84 m$^2$/g.

17. A membrane electrode assembly comprising the multiwalled carbon nanotube supported platinum catalyst of claim 16.

18. A PEM fuel cell comprising the multiwalled carbon nanotube supported platinum catalyst of claim 16.

19. The multiwalled carbon nanotube supported platinum catalyst of claim 16, having an initial electrochemical surface area prior to operation in a fuel cell when disposed in a membrane electrode assembly, and being capable of maintaining at least about 90% of the initial electrochemical surface area after 100 hours of operation at 80° C., ambient pressure, and 0.4 V load.

* * * * *